United States Patent [19]

Yuasa et al.

[11] Patent Number: 4,952,035
[45] Date of Patent: Aug. 28, 1990

[54] OPTICAL ELEMENT AND DEVICE USING SAME

[75] Inventors: Satoshi Yuasa, Yokohama; Yukuo Nishimura, Sagamihara; Masahiro Haruta; Yoko Yoshinaga, both of Tokyo; Hirohide Munakata, Yokohama, all of Japan

[73] Assignee: Canon Kabushiki Kaisha, Tokyo, Japan

[21] Appl. No.: 841,770

[22] Filed: Mar. 20, 1986

[30] Foreign Application Priority Data

| Mar. 22, 1985 | [JP] | Japan | 60-55698 |
| Apr. 30, 1985 | [JP] | Japan | 60-91021 |
| Jun. 3, 1985 | [JP] | Japan | 60-118769 |
| Jun. 18, 1985 | [JP] | Japan | 60-130696 |

[51] Int. Cl.$^5$ ............................................. G02F 1/01
[52] U.S. Cl. ..................................... 350/354; 350/353; 350/363
[58] Field of Search ............... 350/353, 354, 355, 356, 350/359, 360, 363

[56] References Cited

U.S. PATENT DOCUMENTS

| 2,710,274 | 6/1955 | Kuehl | 154/2.77 |
| 3,390,933 | 7/1968 | Hovey et al. | 350/160 |
| 4,169,661 | 10/1979 | Yamada et al. | 350/353 |
| 4,260,225 | 4/1981 | Walles | 350/353 |
| 4,307,942 | 12/1981 | Chahroudi | 350/353 |

FOREIGN PATENT DOCUMENTS

| 54-7360 | 1/1979 | Japan . | |
| 0220128 | 12/1983 | Japan | 350/353 |
| 60-79334 | 5/1985 | Japan . | |

Primary Examiner—Eugene R. Laroche
Assistant Examiner—Nathan W. McCutcheon
Attorney, Agent, or Firm—Fitzpatrick, Cella, Harper & Scinto

[57] ABSTRACT

An optical element comprises a gel layer exhibiting a light scattering property when heated and exhibiting transparency when cooled, and the gel layer is sandwiched between a transparent substrate and a transparent protective plate.

11 Claims, 12 Drawing Sheets

OPTICAL ELEMENT AND DEVICE USING SAME

BACKGROUND OF THE INVENTION

1. Field of the Invention

This invention relates to a novel optical element, and more particularly, to an optical element utilizing the light scattering property of gel.

2. Description of the Related Art

As office automation (OA) has recently been developed, display devices have been widely used in the field of business machine. Desirable display devices are those which do not cause fatigue of eyes even when used for a long time. Heretofore, as the display element, there have been known non-luminant type display elements such as electric field coloring devices (ECD), liquid crystal devices (LCD) and the like.

However, there are disadvantages that ECD has a low display contrast and LCD has a narrow visual field angle. When these devices are used as light modulation elements such as light shutter and the like, there are the same disadvantages.

Heretofore, there has been widely effected recording or display by using light flux. A technique for modulating the light flux is disclosed, for example, in Japanese Patent Application Laid-open No. 56-5523, that is, modulation of light is conducted by changing the electric field in the crystal having an electrochemical effect and diffracting light flux incident on the part where the refractive index in crystal is changed by the distribution of electric field.

On the other hand, distribution of refractive index due to thermal effect is utilized to modulate light. The light modulation of this type is disclosed in 'Deflection of light by change of refractive index due to heat' (NIKKEI ELECTRONICS, issue of Aug. 16, 1982) or 'Response speed of TO glass wave guide type light switch' (Denshi Tsushin Gakkai, General national meeting, 1982).

However, electrochemical crystal of the conventional techniques is expensive and it is necessary upon using the crystal to give a predetermined characteristics to a light flux incident on the crystal. When modulation of light is effected, there is a restriction that light flux should be incident parallel to the electrode as far as possible so as to cause total reflection of the light flux at the portion in an optical crystal material where the electric field distribution is generated and improve the diffraction efficiency.

On the other hand, according to the method utilizing thermal effect, a $TiO_2$ crystal or a glass produced by an ion exchange method is used as a thermal effect medium. In general, dependency of refractive index of solid on temperature is so low that voltage applied across electrodes or voltage applied to a heater resistance should be high so as to obtain a desired deflection characteristics.

In the examples as above, the propagation device of the incident light flux is limited with respect to the position of electrode and heater so as to obtain a deflection characteristic of good efficiency. As mentioned above, since the temperature dependency of refractive index is small, it is necessary to propagate the light flux at a region near to the electrode and heater as far as possible and parallel to the electrode and heater surface so as to give an appropriate phase change.

In conventional display elements, for example. ECD, there are drawbacks that display contrast is low, image surface is not seen easily, and in case of LCD, the visual field angle is narrow. Therefore, none of them can not sufficiently meet the demand that fatigue of eye of the user is not caused even if the device is used for a long time. These conventional display elements can be utilized as a light modulation element such as light shutter and the like, and also suffur from the similar drawbacks.

SUMMARY OF THE INVENTION

The present invention overcomes the abovementioned drawbacks of conventional elements.

A primary object of the present invention is to provide an element of high quality which has a wide visual field angle as a display device, is excellent in clearness and does not cause fatigue of eye, and also a light modulation element which exhibits high contrast and has a low dependency on light incident angle.

According to the present invention, there is provided an optical element which comprises a gel layer exhibiting a light scattering property when heated and exhibiting transparency when cooled, the gel layer being sandwiched between a transparent substrate and a transparent protective plate.

DESCRIPTION OF TEH PREFERRED EMBODIMENTS

Figure 1:
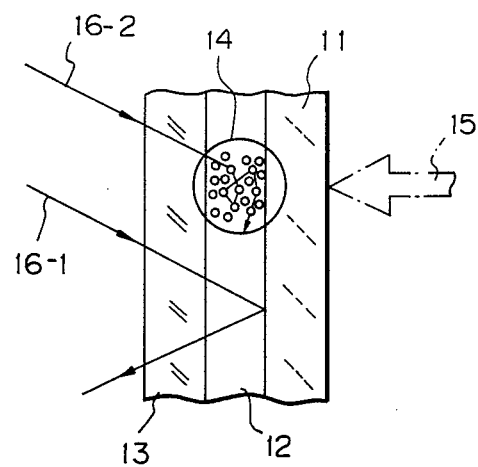
FIG. 1 shows schematically a constitution of the present invention.

The present invention will be further explained referring to the drawings. FIG. 1 shows schematically the construction concerning the fundamental principle of the present invention. In FIG. 1, 11 is a substrate, 12 is a gel layer, 13 is a transparent protective plate.

Where the optical element is that of a transpartent type, substrate 11 is made of a transparent material such as glass, plastics and the like. Where the optical element is of a reflection type, substrate 11 is made of opaque material, for example, semiconductors such as silicon and the like, ceramics, metals such as aluminum, and opaque plastics.

Gel layer 12 is composed of a network polymer containing liquid (gel). As the network polymer constituting the gel, there may be mentioned preferably copolymers produced by solution polymerization of hydrophilic monomers such as N-isopropyl acryl amide and the like as a main component and polyfunctional monomers such as N,N-methylene bisacrylamide, ethyleneglycol dimethacrylate and the like as a crosslinking component, polymers produced by polymerization of hydrophilic polymers such as poly-N-isopropylacrylamide, polyethylene oxide, polypropylene oxide, polyvinyl alcohol and the like as a main component, and trichloro-S-triazine, succinic acid chloride, glutaraldehyde, dimethylol urea or the like as a crosslinking agent, and the like.

On the other hand, as a liquid constituting the gel, there may be preferably mentioned water, an organic solvent, for example, alcohols such as methanol, ethanol, ethyleneglycol, glycerine and the like, ketones such as acetone, methyl ethyl ketone, and the like, amides such as dimethylformamide, hexamethylphosphoryl amide, dimethyl acetamide and the like, amines such as pyridine, triethylamine and the like, and sulfur containing solvents such as dimethyl sulfoxide and the like, or a mixture of water of the organic solvent, or a solution formed by adding a solute such as potassium chloride, sodium chloride, urea and the like to the solvent.

The thickness of gel layer 12 is preferably 1-1000 $\mu$m, more preferably 1-100 $\mu$m.

As the transparent protective plate 13, there may be mentioned a transparent member such as glass, plastics, dielectric members and the like. In order to improve the contrast, the surface of substrate 11 may be provided a visible light reflecting layer and a visible light absorbing layer (not shown).

The principle of operation of the optical element (imaging and light modulation) will be explained using FIG. 1, which shows an example of the reflection type.

First, where gel layer 12 is not warmed (i.e. at a low temperature state), distribution of the polymer molecular chain is uniform averagely so that the light 16-1 incident on the low temperature region of gel layer 12 passes through gel layer 12 as it is, and is reflected normally at the surface of substrate 11, then passes again gel layer 12 and goes out from transparent protective plate 13.

On the other hand, in the case where a predetermined position 14 in gel layer 12 is warmed according to an information signal, for example, by an external heating means such as irradiation of infrared ray beam 15, the distribution of polymer molecular chains is separated to a sparse region and a dense region resulting in exhabiting a light scattering property Therefore, light 16-2 incident on the warmed region 14 is scattered. When the temperature at the warmed region 14 is lowered, the light incident thereon is reflected normally again.

As is clear from the above, the feature of the present invention is that light modulation and display are effected by thermally controlling scattering and non-scattering in a gel layer.

EXAMPLE 1

As a substrate 11 and a transparent protective plate 13, there was used a sufficiently cleaned glass of 0.3 mm thick and 50 mm$\times$10 mm in size for each. The two glass plates were faced to each other at a distance of 10 $\mu$m using a Mylar film as a spacer and adhered to for a cell.

N-isopropyl acrylamide 4.8 g and N,N-methylene-bis-acrylamide 80 mg were dissolved in a cold water, and ammonium persulfate 50 mg was dissolved therein followed by adding 150 $\mu$l of tetramethyl ethylene diamine. Then the mixture was subjected to deaeration under reduced pressure to form a monomer solution. The resulting monomer solution was immediately charged in the cell followed by sealing. After standing for 30 min., a gel layer 12 was formed. Thus an optical element was produced.

The resulting optical element was irradiated in a manner of scanning with a semiconductor laser beam of input of 20 mW and wavelength of 830 nm in accordance with information signals. The laser beam was focussed on the gel layer 12 from the back side of the optical element. As a result, a predetermined portion of gel layer 12 turned into opaque. It is considered that the semiconductor laser beam was absorbed at the irradated region of the gel layer 12 and converted to heat.

The heating by the semiconductor laser beam was effected only in a moment, and then the gel layer 12 immediately returned to a transparent state.

The above-mentioned irradiation experiment by the laser beam was repeated and it was found that the reproducibility and signal response were practically satisfactory.

EXAMPLE 2

N-isopropyl acrylamide 4 g, ethylene glycol dimethacrylate 70 mg, and hydroxyethyl methacrylate 0.5 g were dissolved in 60 ml of a cold water and further ammonium persulfate 50 mg was dissolved therein, and then tetramethylethylenediamine 150 $\mu$l was added followed by deaerating under reduced pressure. The resulting solution was used as a monomer solution in a manner similar to the procedures in Example 1 above to produce an optical element.

The resulting optical element was subjected to imaging and light modulation as in Example 1 and there was obtained a good result similar to that in Example 1.

EXAMPLE 3

Polypropylene oxide (triol type, average molecular weight 3000, supplied by Wako Junyaku) 1.2 g was dissolved in 20 ml of water, and 0.1 g of dimethylolethylene urea was added. pH of the resulting mixture was made about 6 with hydrochoric acid and the mixture was kept at 40° C. a whole day and night to effect gelling.

The resulting gel was soaked in a large amount of water overnight, and then charged between a substrate and a protective plate in a way similar to Example 1 and sealed to produce an optical element. The thickness of the gel layer 2 was 100 μm.

The resulting optical element was subjected to an experiment of imaging and light modulation as in Example 1, and there was obtained a similar good result.

In the above-mentioned examples, optical elements of reflection type are explained, but optical elements of transparent type also can give characteristics similar to those of reflection type.

Since the optical element according to the present invention is excellent in scattering characteristics, there can be obtained clear images of high contrast and high resolution, and limitation of visual field angle can be eliminated. Therefore, even when the optical element is used as a display device for a long time, fatigue of eye is not caused. Further, the gel layer is modulated by a slight heating, and therefore, the power consumption of the display device can be saved. Further, high frequency modulation is possible.

Figure 2:
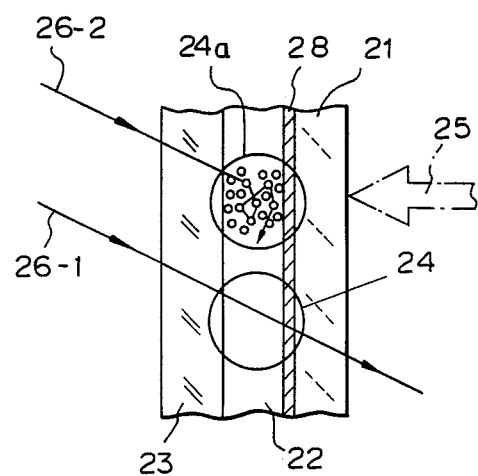
FIG. 2 shows schematically a constitution of the present invention.

Referring to FIG. 2, 21 is a substrate, 22 a gel layer, 23 a transparent protective plate, and 28 an infrared ray absorption layer corresponding to a heat generating element. Substrate 21 is made of a transparent material such as glass, plastics and the like when the optical element is of a transparent type while substrate 21 is made of an opaque material, for example, semiconductor such as silicon and the like, ceramics, metals such as aluminum and the like, or a material composed of a transparent material as mentioned above the surface of which a metal film is vapor-deposited when the optical element is of a reflection type. Gel layer 22 is composed of a network polymer (gel) containing liquid.

As the network polymer constituting the gel, there may be preferably mentioned, for example, copolymers produced by solution polymerization of a hydrophilic monomer such as N-isopropylacryl amide and the like as a main component and a polyfunctional monomer such as N,N-methylene-bis-acryl amide, ethylene glycol dimethacrylate and the like as a crosslinking component, and polymers produced by polymerization reaction of a hydrophilic polymer such as polyethylene oxide, polypropylene oxide, polyvinyl alcohol and the like as a main component with a crosslinking agent such as trichloro-S-triazine, succinic acid chloride, glutaraldehyde, dimethylol urea and the like.

As a liquid constituting a gel, there may be preferably used water, alcohols such as methanol, ethanol, ethylene glycol, glycerine and the like, ketones such as acetone, methyl ethyl ketone, and the like. The thickness of gel layer 22 is preferably 1 μm–1000 μm, more preferably 1 μm–100 μm.

As a heat generating element, there may be used, for example, an infrared ray absorbing layer when heating by absorbing infrared ray is utilized as the heating means. The infrared ray absorbing layer material can be produced by forming a film of various known inorganic or organic materials which themselves are not easily melted. Such material includes preperably Si, SiO, $SiO_2$, ZnS, $As_2S_3$, $Al_2O_3$ NaF, ZnSe, Gd.Tb.Fe, carbon black, metal phthalocyanine and the like. The thickness of the infrared ray absorbing layer 29 is preferably 500Å–10000Å.

As a transparent protective plate 23, there may be used a transparent member composed of glass, plastics, dielectric substance or the like. In order to improve contrast, a visible ray reflecting layer or visible ray absorbing layer (not shown) may be provided on substrate 21.

The principle of performance of the optical element (imaging and light modulation) will be explained referring to FIG. 2. FIG. 2 shows an example of a transparent type.

First, when gel layer 22 is not yet warmed (that is, at a low temperature), the distribution of polymer molecule chain is averagely uniform, and therefore, light 26-1 incident on a low temperature region 24 of gel layer 22 passes through gel layer 22 and goes out of substrate 21 as it is. On the other hand, when a predetermined position of infrared ray absorbing layer 28 is heated in accordance with an information signal, for example, externally heated by irradiation with infrared ray beam 5, the gel layer at the region contacting or contiguous to the heated portion is also warmed so that the distribution of the polymer molecule chains is separated to spars region and dense region resulting in exhibiting light scattering. Therefore, light 26-2 incident on a warmed region 24 a is scattered. The warmed region 24 a returns to the original transparent state when the temperature is lowered.

As is clear from the above-mentioned explanation the present invention is concerned with light modulation and display effected by thermally controlling scattering (opaque) and non-scattering (transparent).

EXAMPLE 4

FIG. 2 schematically shows the constitution of the present invention. In FIG. 2, as substrate 21 and transparent protective plate 23, sufficiently cleaned glass plates each of which is 0.3. mm in thickness and 50 mm × 10 mm in size were used. A Gd.Tb. Fe (gadolinium.terbium.iron) layer of 1500 Å thick was formed on the surface of the glass plate of substrate 21 by sputtering to produce an infrared ray absorbing layer 28. The surface of infrared absorbing layer 28 of substrate 21 and the transparent protective plate 23 were placed to face each other at a distance of 10 μm using a Mylar film as a spacer and adhered Then N-isopropyl acrylamide 4.8 g and N,N-methylene-bis-acrylamide 80 mg were dissolved in 60 ml of cold water, and ammonium persulfate 50 mg was dissolved therein followed by adding 150 μl of tetramethyl ethylele diamine. Then the mixture was subjected to deaeration under reduced pressure to form a monomer solution.

The resulting monomer solution was immediately charged in the space between substrate 21 and transparent protective plate 23 and sealed, followed by standing for 30 min. to form a gel layer 22. Thus an optical element was produced.

The resulting optical element was irradiated in a manner of scanning with a semiconductor laser beam of input of 20 mW and wavelength of 830 nm in accordance with information signals. The laser beam was focussed on the infrared ray absorbing layer 28 from the back side of the optical element. As a result, a predetermined portion of gel layer 22 turned into opaque. This is considered that the semiconductor laser beam was absorbed at the irradiated region of the gel layer 22 and converted to heat, and then a gel layer portion contacting the irradiated portion is heated. The heating by the semiconductor laser beam was effected only in a moment and then the gel layer 22 immeiately returned to a transparent state.

The above-mentioned irradiation experiment by the laser beam was repeated and it was found that the reproducibility and signal response were practically satisfactory.

EXAMPLE 5

N-isopropyl acrylamide 4 g, ethylene glycol dimethacrylate 70 mg, and hydroxyethyl methacrylate 0.5 g were dissolved in 60 mg of a cold water and further ammonium persulfate 50 mb was dissolved therein, and then tetramethylethylenediamine 150 μl was added followed by deaerating under reduced pressure. The resulting solution was used as a monomer solution in a manner similar to the procedures in Example 4 above to produce an optical element.

The resulting optical element was subjected to imaging and light modulation as in Example 4 and there was obtained a good result similar to that in Example 4.

EXAMPLE 6

Figure 3:
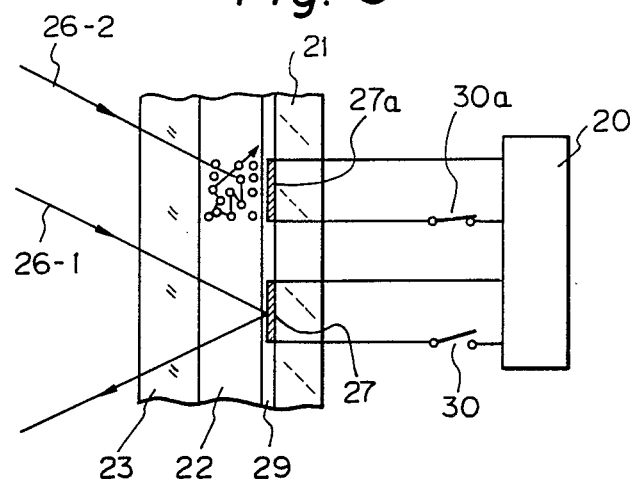
FIG. 3 shows schematically a constitution of the present invention.

FIG. 3 shows schematically a further embodiment of the present invention. In this Example 6, as a heat generating element, a resistive heater layer 27 was provided on the surface of substrate 21 in place of an infrared ray absorbing layer 28 used in Examples 4 and 5, and heating of the resistive heater layer 27 was controlled by the electric current from power source 20. This Example 6 is concerned with a reflection type.

As the material for resistive heater layer 27, there may be used, for example, metal compounds such as hafnium boride, tantalum nitride and the like, alloys such as nichrome and the like, transparent oxides such as ITO (Indium Tin Oxide) and the like. The thickness of resistive heater layer is preferably 500–5000Å. An insulating layer (protective layer) 29 is formed on the surface of resistive heater layer 27 and between gel layer 22 and resistive heater layer 27.

Referring to FIG. 3, a switch 30 connected with a resistive heater 27 is off so that electric current does not flow to the resistive heater layer 27 Therefore, the incident light 26-1 substantially passes a gel layer 22 as it is and then is normally reflected on the surface of the resistive heater layer 27 and passes gel layer 22 again and goes out of a transparent protective plate 23.

On the other hand, a switch 30a connected with resistive heater layer 27a is on so that resistive heater layer 27a is heated with electric current from a power source 20. Thus, the incident light 26-2 is scattered as mentioned above.

As mentioned above, when resistive heater layer 27 is used as a heat generating element in place of infrared ray absorbing layer 28, the effect is the same as that when infrared ray absorption layer 28 is used, and therefore the element using resistive heater layer 27 can be used as an optical element to effect imaging and light modulation.

Figure 4:
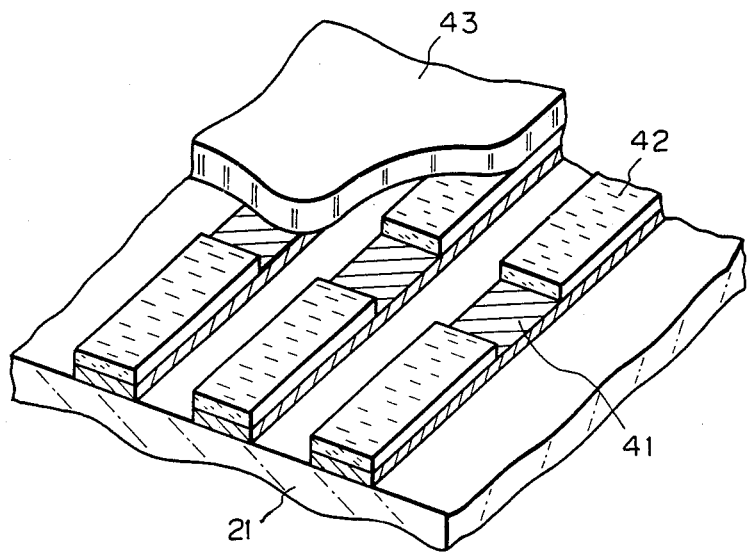
FIG. 4 is an oblique view of a substrate of the present invention.

Further embodiment of the present invention will be explained below. Referring to FIG. 4, an oblique view of a further example of the substrate of the present invention is shown. In this example, substrate 21 and transparent protective plate 23 are the same as those used in Example 4.

In FIG. 4, on the surface of substrate 21 was formed a tantalum nitride film of 1000 Å thick by sputtering, and then a photoresist was applied to the film surface to form 20 lines/mm of stripe-like pattern parallel to the short side (10 mm) of substrate 21. Then, unnecessary tantalum nitride film was selectively removed by etching and the remaining portions were used as resistive heater layer 41. An ITO film of 2000 °Å thick was formed on the resistive heater layer 41 by sputtering, and a similar treatment was effected for patterning to produce electrode layers 42 of stripe type as shown in FIG. 4. Further a part of ITO on the resistive heater layer was removed so as to obtain a heat generating portion (40μm×26 μm).

Then, an $SiO_2$ film of 2 μm thick was formed thereon by sputtering as an insulating layer 43, but both end portions of the resistive heater layer 41 were masked so as not to form an $SiO_2$ film thereon since it is necessary to connect with lead wires. The substrate 21 provided with a resistive heater layer 41 and a transparent protective plate 23 were placed face to face using a Mylar film as a spacer at a distance of 10 μm and adhered to each other.

Then, N-isopropyl acrylamide 4.8 g, N,N-methylene-bis-acrylamide 80 mg, and ammonium persulfate 30 mg were dissolved in 60 ml of cold water, and 150 μm of tetramethyl ethylenediamine was added thereto followed by deaeration under reduced pressure to obtain a monomer solution. This monomer solution was immediately charged in the space between substrate 21 and transparent protective plate 23 and sealed. After standing for 30 min. at room temperature to form a gel layer 22. Thus an optical element was produced.

An electric pulse signal (pulse height of °V and pulse length of 5 m sec) of frequency of 1 KHz was inputted to an optional combination of resistive heater layer 41 of the resulting optical element in correspondence to an information signal, and a predetermined position corresponding to the information signal exhibits opaque to respond thereto and it was confirmed that writing corresponding to the information signal was possible.

As is clear from the above examples, the optical element according to the present invention can give good results in each of the transparent type and the reflection type.

According to the present invention, the optical element is so excellent in scattering characteristics that highly clear images of high contrast and high resolution can be obtained and the limitation as to the visual field angle can be eliminated. Therefore, even when the optical element is used for a display apparatus for a long time, fatigue of eye is not caused. Further, the gel layer is modulated by only slight heating so that the power consumption of the display apparatus can be saved. In addition, high frequency modulation is possible.

According to a further, example of the present invention, there is provided a light modulation apparatus comprising a signal input portion, a light receiving medium and a light modulation element capable of applying a light to a light receiving medium and intercepting a light in accordance with an input signal, characterized in that the light modulation element comprises a heat generating resistive member generating heat in accordance with an input signal and a light modulation member causing light scattering when it receives a heat generated at the heat generating resistive member, and the light modulation member being composed of an organic polymer gel.

More particularly, the signal input portion and the light receiving medium constituting the light modulation apparatus may be those of known constitutions and the main feature of the present invention resides in the constitution of the light modulation element using a particular light modulation member, and it is a feature of the present invention that the light modulation member is constituted of an organic polymer gel capable of repeating transparency and opacity reversibly in accordance with the thermal effect.

The organic polymer gel of the light modulation member according to the present invention is composed of a crosslinked organic polymer which is not unlimitedly dissolved in an appropriate organic solvent, water or mixture thereof and can form an organic polymer gel by absorbing and containing such solvent.

As the crosslinked polymer, there may be mentioned polyalkenes such as polypropylene, polyisobutene and the like, polydienes such as polybutadiene, polyisoprene and the like, polyvinyl compounds such as polyvinyl acetate, polymethacrylate, polymethacryl amide and the like, polystyrenes such as polystyrene, poly-αmethylstyrene and the like, copolymers of monomers constituting the above-mentioned or other polymers, polyethers such as polyethylene oxide and the like, polyimines such as polyethylene imine and the like, polyesters such as polyoxyethylene adipoyl and the like, polyamides such as polyglycine and the like, and other known chain polymers which have polymer chains crosslinked moderately, do not completely dissolved in a solvent and absorb and contain a solvent to form gel.

Such crosslinked structure can be easily formed by various known methods, for example, a method where upon producing the polymer, a polyfunctional monomer is partly used as a crosslinking agent to form a crosslinked structure simultaneously with polymerization., a method where a reactive monomer is also used to form crosslinking points in a polymer and a crosslinked structure is produced utilizing the crosslinking points; and a method where crosslinking is caused by using radiation of the like.

As a liquid used for forming organic polymer gel by the above-mentioned crosslinked polymer, there may be mentioned known organic solvents, water or mixtures thereof, for example, water, alcohols such as methanol, ethanol and the like, ketones such as acetone, methyl ethyl ketone and the like, hydrocarbons such as pentane, cyclohexane, benzene and the like, halogenated hydrocarbons such as tetrachloroethane, dichlorobenzene, and the like, esters such as ethyl formate, ethyl acetate, isoamyl acetate and the like, ethers such as dioxane, diglycide and the like, amides such as dimethyl formamide, dimethyl acetamide, and the like, sulfur-containing solvents such as dimethyl sulfoxide and the like, or mixtures thereof. In addition, there may be mentioned solutions composed of the above-mentioned solvents in which a solute such as lithium perchlorate, ammonium propionate, urea, glucose and the like is dissolved.

The organic polymer gel used in the present invention can be formed from the above-mentioned crosslinked polymer and a solvent. An important point is the combination of the crosslinked polymer and the solvent, and the combination is to be such that the crosslinked polymer can form a gel and the resulting gel can form an organic polymer gel capable of turning to white turbidity at a temperature which is not so high, preferably about 30°–100° C. by heat absorption.

The present inventors have found that, upon formation of organic polymer gel, if a crosslinked polymer and a solvent are appropriately combined, the crosslinked polymer is precipitated and white turbidity is formed by change in temperature, that is, temperature rise, and further found that the organic polymer gel is formed into, for example, a thin layer of about 1 μm–1 mm and when heat is applied partly to the thin layer, white turbidity is immediately formed at the heated portion while when heat is removed, the white turbid portion is immediately eliminated. In addition, it has been found that the very excellent heat response, that is, transparency ⟷ white turbidity is useful as a light modulation member of a light modulation apparatus and when this light modulation member is used, there can be obtained a light modulation apparatus free from various drawbacks.

The organic polymer gel having such an excellent heat response can be easily formed by selecting a solvent suitable for the selected crosslinked polymer and controlling the solvent affinity of the crosslinked polymer.

Further, the heat response of an organic polymer gel can be controlled to a desired range by once forming an organic polymer gel by using a relatively good solvent and then absorbing a relatively poor solvent thereto, or by using a solvent mixture of various mixing ratio.

According to the detailed study of the present inventors, it has been found that a desired organic polymer gel can be produced by using a crosslinked polymethacryl amide type polymer, preferably, N-alkyl substituted crosslinked polymethacryl amide, and water.

As the desired crosslinked polymethacrylamide polymer, there may be mentioned crosslinked homopolymers of monomers such as N-ethyl methacryl amide, N-n-propyl methacrylamide, N-iso-propyl methacrylamide, N-cyclopropyl methacrylamide, N,N-ethyl methyl methacrylamide. N,N-diethyl methacrylamide, N-acrylpyrrolidone, N-acrylpiperidine and the like, or crosslinked copolymers of the above-mentioned monomer with other monomer.

The crosslinking can be easily effected by using a necessary amount of a polyfunctional monomer such as N,N-methylene-bis-acrylamide, ethyleneglycol dimethacrylate and the like upon polymerization of methacrylamide.

The organic polymer gels composed of crosslinked polymethacrylamides and water are the best organic polymer gel since the reversible change between transparency and white turbidity by heat occurs at about 30°–100° C. and the heat response is very sharp.

The light modulation member used in the present invention, that is an organic polymer gel thin layer may be produced by forming an organic polymer gel having a concentration of crosslinked polymer of about 2–5% and forming the organic polymer gel into a thin layer of about 1 μm1 mm between a transparent protective plate and a support.

As mentioned above, the light modulation apparatus of the present invention is constituted of a signal input portion, a light modulation element composed of the above-mentioned particular light modulation member, and a light receiving medium. The signal input portion, other members constituting the light modulation element and the light receiving medium may be those of known structures. In the following, referring to the drawing, preferable embodiments of the present invention of the light modulation apparatus some parts of which may be constituted of known structures as mentioned above will be explained more in detail.

Figure 5:
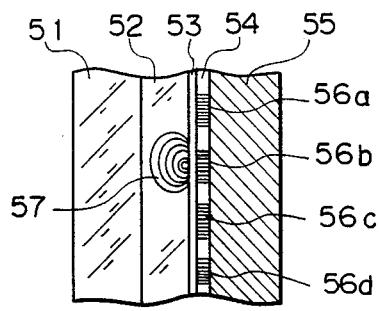
FIG. 5 and FIG. 6 show an example of a light modulation element used in the present invention.

FIG. 5 shows an embodiment of a light modulation element for the light modulation apparatus according to the present invention. In FIG. 5, 51 is a transparent protective plate, 52 is an organic polymer gel thin layer, 53 is an insulating layer having thermal conductivity, 54 is a heat generating resistive member layer in which heat generating resistive members 56a, 56b, 56c, 56d—are arranged 55 is a support for an insulating layer 53 and heat generating resistive members 56a, 56b—. When the heat generating resistive members generate heat, the heat is transferred to the insulating layer 53 and then to the organic polymer gel thin layer 52 to form a white turbid portion 57 in the organic polymer gel thin layer 52 resulting in exhibiting a light scattering property.

For example, as shown in FIG. 5, when heat generating resistive member 56b is selected to generate heat, the heat is transferred to organic polymer gel thin layer 52 through insulating layer 53 adjacent to heat generating resistive member 56b, and then heats the organic polymer gel at the region of the organic polymer gel thin layer 52 facing the heat generating resistive member 56b, and a white turbid portion 57 is formed at that region.

As a predetermined period of time lapses, the white turbid portion 57 disappears as the organic polymer gel at this region is cooled. This one cycle of formation and disappearing of the white turbid portion 57 is a very short time and it can be effected on the order of KHz.

The above-mentioned heat generating resistive member 56a, 56b—can be formed on support 55 by I.C. fabricating technique, and the distance between the adjacent heat generating resistive members (56a, 56b—) can be made on the order of mµ.

In this way, as a light modulation member deforming the wave surface of an incident light, an organic polymer gel is used and therefore, it is not necessary to pay a special attention to a polarized light, different from the case of crystal in conventional technique.

In prior arts, it is necessary that the light flux is propagated in the direction parallel to the electrode surface or heater surface, but in the present invention this is not necessary, that is, the light flux may be incident on the heater surface at a right angle or other angle and therefore, there is not such a limitation as above with respect to arrangement upon assembling light modulation elements to fabricate a light modulation apparatus.

Figure 6:
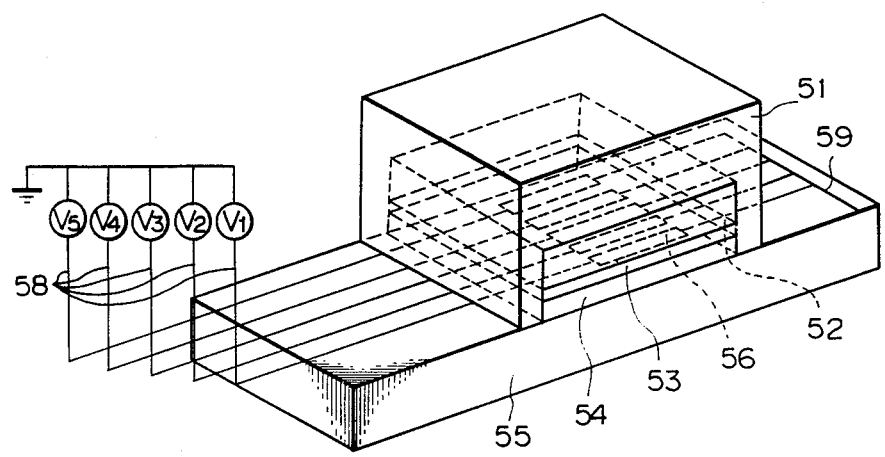

FIG. 6 is an oblique view showing the constitution of the light modulation element in FIG. 5 and the reference numerals 51–56 are the same as those in FIG. 5. 58 is leading wires constituting a signal input portion and is connected to each distinct driving voltages so as to drive independently each of heat generating resistive members 56a, 56b, —. The other end of the heat generating resistive member is earthed or set to a common voltage. Voltage signals are applied to respective heat generating resistive members (56a. 56b,—) from lead wires 58, and then white turbid portion 57 is formed in organic polymer gel thin layer 52 adjacent to each heat generating resistive member (56a, 56b,-. The white turbid portion 57 is cooled and returns to the original non-white turbid state when the voltage signal is made zero.

Figure 7A:
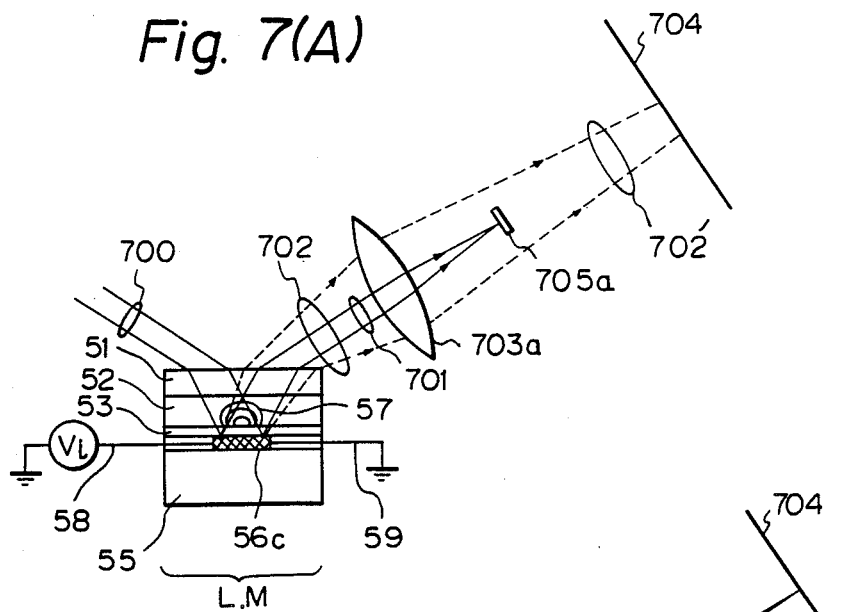
FIG. 7(A) and FIG. 7(B) show examples of a light modulation apparatus according to the present invention.

FIG. 7(A) shows an embodiment of light modulation apparatus using a light modulation element L.M. by the above-mentioned light scattering and an example where the light flux whose wave surface is deformed by light scattering is used as an information light.

When a flux 700 is incident on the light modulation element L.M. and an optionally selected heat generating resistive member 56c among the heat generating resistive members (56a, 56b,-) is driven by voltage Vi, a white turbid portion 57 is formed and the light flux incident on the heat generating resistive member 5c goes out as a light flux 702 whose wave surface is deformed.

A light flux 701 which has been normally reflected on the surface of the heat generating resistive member and whose wave surface has not been deformed by the white turbid portion 57 forms image by a lens 703a and is subjected to shading by a shading filter 705a disposed at the image formation position.

The light flux 702 whose wave surface has been deformed is partly shaded by the shading filter 705a. However, by making the size of shading filter 705a the minimum size which shades the image formation spot of the light flux 701 whose wave surface has not been deformed, it is possible to project most of the wave surface deformed light flux 702 onto a light receiving medium 704.

According to the present invention, since a material capable of making the degree of light scattering drastic can be freely selected as a thermal effect light modulation member and the divergent angle of a light flux caused by the white turbid is larger than the diffraction angle when the above-mentioned electrooptical crystal is used, even when the same size of a shading filter 705a is used, the rate of the divergent light shaded is very small in the present invention.

As mentioned above, when a voltage pulse corresponding to an input signal is added to a heat generating resistive member 56c through a lead wire 58 or is made zero, the formation and elimination of the white turbid portion 57 are repeated.

At that case, a light spot comes on or off on the light receiving medium 704. By making a point on the heat generating resistive member and a point on the light receiving medium 704 conjugate by the lens 703a, an image at the portion where a light scattering is generated contiguous to the heat generating resistive member can be formed on a light receiving medium 704 as a spot.

Figure 7B:
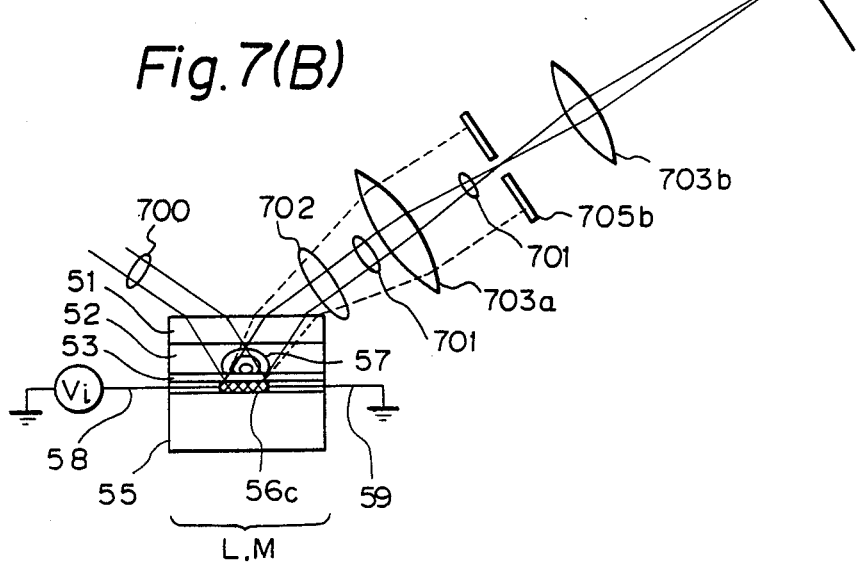

FIG. 7(B) also shows an embodiment of a light modulation apparatus using the above-mentioned light modulation element L.M. and an example where a light flux 701 not scattered at the white turbid portion 57 is used as an information light.

In FIG. 7(B), a light shading plate 705b is provided at a position to which a light flux 701 not modulated by the light modulation element L.M is condensed by a lens 703a. This light shading plate is provided at the center portion with an aperture so as to allow the light flux 701 to pass and shade the light flux 702 shown by the broken line and diverged by the light modulation element L.M .

Thus, most of the divergent light by light scattering is shaded by shading filter 705b, and only the light flux 701 not subjected to deformation of wave surface mainly passes the shading filter 705b. By providing a lens 703b making conjugate the relation between the image formation spot by a lens 703a or the shading filter 705b and the light receiving medium 704, a light spot comes on or off at the light receiving medium.

FIG. 8 shows a state of light flux incident on a light modulation element L.M which improves the contrast of coming on and off of light, that is, optimizing the light utilization efficiency.

FIG. 8 A is a view of a light modulation element L.M in the direction of arrangement of the heat generating resistive member, and FIG. 8 B is a view of the light modulation element L.M in the direction perpendicular to the direction of arrangement of the heat generating resistive member.

The nearer to the heat generating resistive member, the larger the degree of light scattering. When a light flux 706 is concentratedly incident thereon, the efficiency of divergence becomes the highest.

Depending on the roughness or degree of planeness of the surface of support 5, heat generating resistive members (56a, 56b,-), or insulating layer 53, the shading efficiency of shading filter 705b as to the light flux other than that of divergent light produced by light scattering, and therefore a noise light is projected on light receiving medium 704.

This noise light is projected on light receiving medium 704 regardless of input signal voltage pulse series Vi applied by lead wire 58, and therefore, the contrast is lowered. In order to eliminate such drawbacks, it is desired to converge, in a form of line, the input light flux 706 at a region contiguous to the heat generating resistive members.

707 is a normal reflection light flux (not diverged by light scattering) of incident light flux 706 and a broken line 708 shows a divergent light flux caused by light scattering.

Figure 8A:
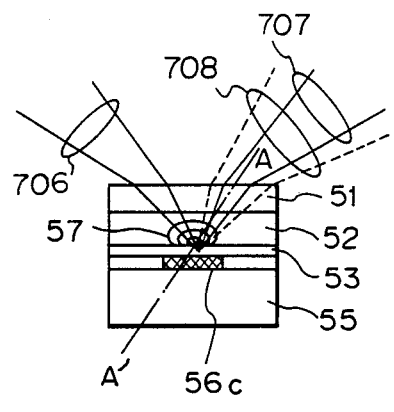
FIG. 8(A) and FIG. 8(B) show preferable examples of illuminating a light modulation element according to the present invention.
Figure 8B:
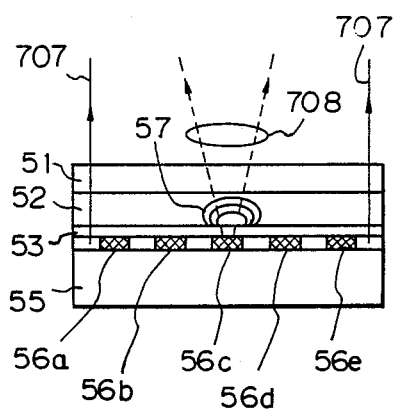

FIG. 8(B) is a cross-sectional view taken along A-A' in FIG. 8(A). 707 is a normal reflection light flux of an incident light flux 706. 708 is a divergent light flux caused by a white turbid portion 57 generated at a portion contiguous to a portion of heat generating resistive member 56c to which an image signal is inputted, and 708 is scattered to a direction different from the normal reflection light flux 707.

Figure 9:
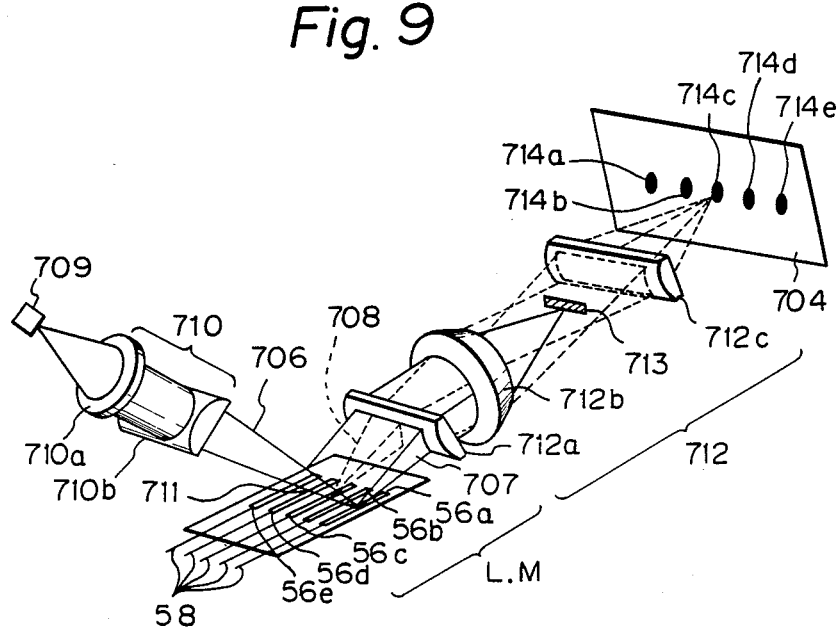
FIG. 9 shows another example of a light modulation apparatus according to the present invention.

FIG. 9 shows an arrangement of an example of a light modulation apparatus of the present invention which exhibits a enhanced light utilization efficiency and a good contrast of coming on and off as explained in FIG. 8.

In this example, a light flux emitted from a light source 709 such as a semiconductor laser or a light emitting diode forms an image in a form of line in the direction of arrangement of heat generating resistive members (56a, 56b,-) of the light modulation element L.M by an line image forming optical system 710 constituted of a spherical lens 710a and an anamorphic lens 710b.

The component of the light flux formed in a form of line in a plane perpendicular to the direction of arrangement of heat generating resistive members converges on the heat generating resistive member, but the component of the light flux in a plane defined by the direction of arrangement and the optical axis to the line image forming optical system 710 is in a state of parallel light flux.

Therefore, a light flux 707 not diverged at the heat generating resistive member forms a light path in a form of trigonal prism and is incident on a positive cylindrical lens 712a. The cylindrical lens 712a is provided such that it has a generatrix in the direction of arrangement of heat generating resistive members and the focus line surface consists with the position of heat generating resistive members.

Consequently, light flux 707 passes through cylindrical lens 712a and then becomes afocal light flux and is incident on spherical lens 712b. By spherical lens 712b, the light flux 707 is condensed on the focal surface of the lens. On the focal surface is provided a rectangular filter 713 sufficient to shade the light flux 713, and therefore, a light flux which is not diverged by the heat generating resistive member is shaded by the filter 713.

On the other hand, among the light flux 708 diverged by the heat generating resistive member, only the light flux in the plane perpendicular to the direction of arrangement of the heat generating resistive members becomes a parallel light by a cylindrical lens 712a, and further the light forms an image at a portion contiguous to the rectangular filter 713 by the sphericallens 712b.

Therefore, a part of divergent light flux 708 is shaded by rectangular filter 713, but most of the light flux is not intercepted by shading filter 705, but is incident on a positive cylindrical lens 712c having a generatrix in the same direction as that of the cylindrical lens 712a, and point images (714a, 714b,—) are formed on a light receiving medium 704.

Filter 713 and light receiving medium 704 are located at a focal line surface optically conjugate with respect to cylindrical lens 712c, and the heat generating resistive heater and light receiving medium 704 are optically conjugate with respect to the spherical lens system 712b.

By another expression, with respect to an anamorphic lens system 712 constituted of cylindrical lenses 712a and 712c and spherical lens system 712b, the heat generating resistive members (56a, 56b, —) and light receiving medium 704 are located in an optically conjugate focal line surface in a plane perpendicular to the direction of arrangement of heat generating resistive members. And in the plane defined by the optical axis of anamorphic lens system 712 and the direction of arrangement of heat generating resistive members, the light receiving medium 704 is present on the focal line surface of the anamorphic lens system 712. In FIG. 9, there is shown only the heat generating resistive members as to the light modulation element L.M.

Figure 10:
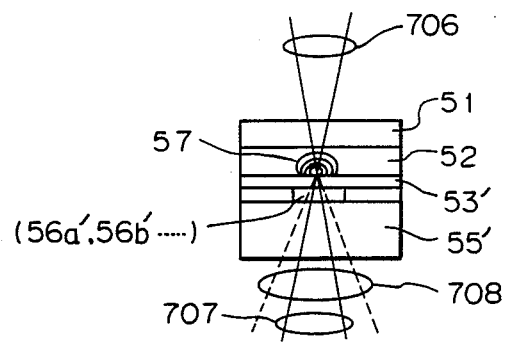
FIG. 10 shows another example of a light modulation element used in the present invention.

In the above-mentioned example, the heat generating resistive members are constituted of a reflecting member and both the divergent light flux and light flux not diverged are reflected by the heat generating resistive members, and in FIG. 10 all light fluxes pass through the light modulation element.

The construction of the light modulation element itself shown in FIG. 10 is the same as that in FIG. 5. but a support 55', heat generating resistive members (56a', 56b',—) and an insulating layer 53'are constituted of transparent media. Also in this case, a sufficient practical effect can be obtained by using the above-mentioned optical system.

Figure 11A:
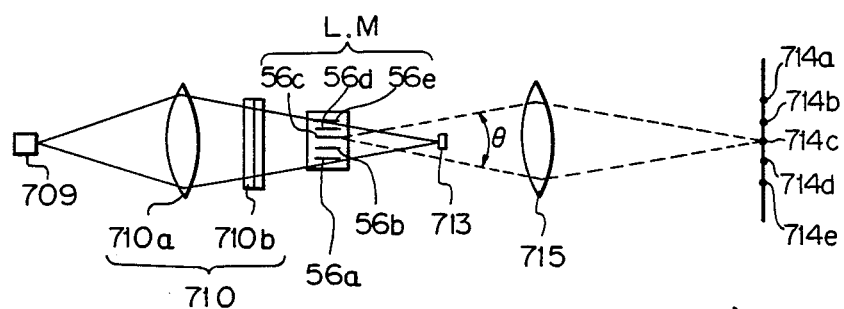
FIG. 11(A) and FIG. 11(B) show further examples of a light modulation apparatus according to the present invention.

FIG. 11(A) and (B) show an example of a light modulation apparatus, and a line-like image is formed in the direction of arrangement of heat generating resistive members (56a, 56b,—) in a light modulation element L.M in a manner similar to the optical system in FIG. 9.

Figure 11B:
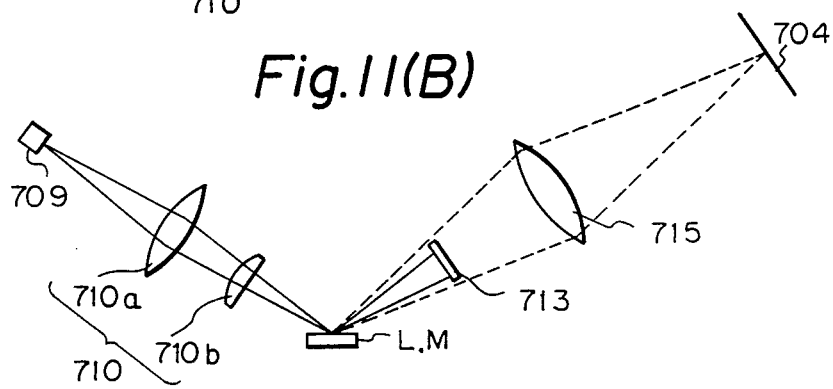

FIG. 11(A) is a view from the direction perpendicular to the line image. FIG. 11(B) is a side view of FIG. 11(A). The difference from the optical system in FIG. 9 reside in that the light flux emitted from the light source is condensed by a lens 710a, and, as shown is FIG. 11(A), a conjugate image of the light source is formed between the light modulation element L.M and a lens 715, and further as shown in FIG. 11(B), a line-like image is formed near to heat generating resistive members of the light modulation element L.M by a line forming optical system 710 composed of a lens 710a and an anamorphic lens 710b.

In FIG. 11(A), a shading filter 713 in a form of rectangle having a long side in the direction perpendicular to the direction of arrangement of heat generating resistive members (56a, 56b,—) is placed at a conjugate image position as to the light source, and therefore, a light flux not diverged by light scattering is shaded while a light flux diverged by light scattering passes the outside of shading filter 713 and is incident on a lens 715 with respect to which heat generating resistive members (56a, 56b,—) and a light receiving medium 704 are at a conjugate relation, and image formation spots 714a, 714b,—are formed on the light receiving medium 704. By arranging the system as mentioned above, as optical system as shown in FIG. 9 can be simplified.

Figure 12:
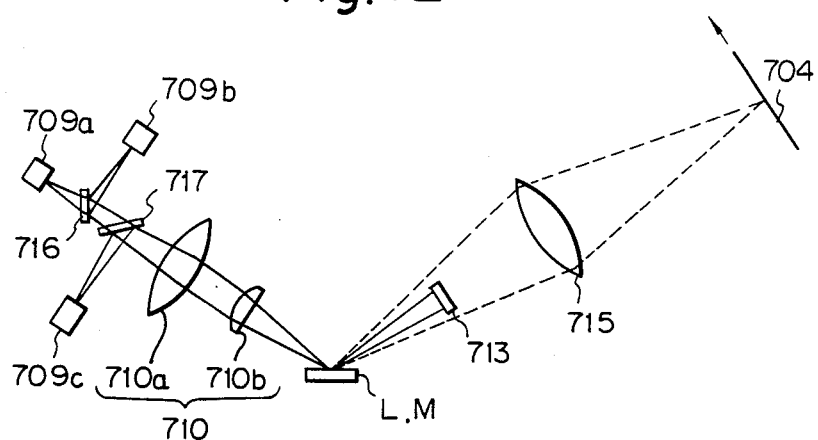
FIG. 12 and FIG. 13 show an example of a color image forming light modulation apparatus according to the present invention.

FIG. 12 shows an example of a light modulation apparatus for producing color images according to the present invention. Light source 709a is a red LED(light emitting diode), 709b a green LED, and 709c a blue LED, and 716 is a dichroic mirror allowing a red wavelength zone to pass and reflecting a green wavelength zone and 717 is a dichroic mirror allowing to pass lights other than a light of a blue wavelength zone and reflecting a blue wavelength zone, and a light flux from each light source reaches heat generating resistive members of the light modulation element L.M. Other structures are the same as those of the optical system as shown in FIG. 11.

It is possible to form color images on light receiving medium 704 by using such light sources of three colors and a light modulation element.

Figure 13:
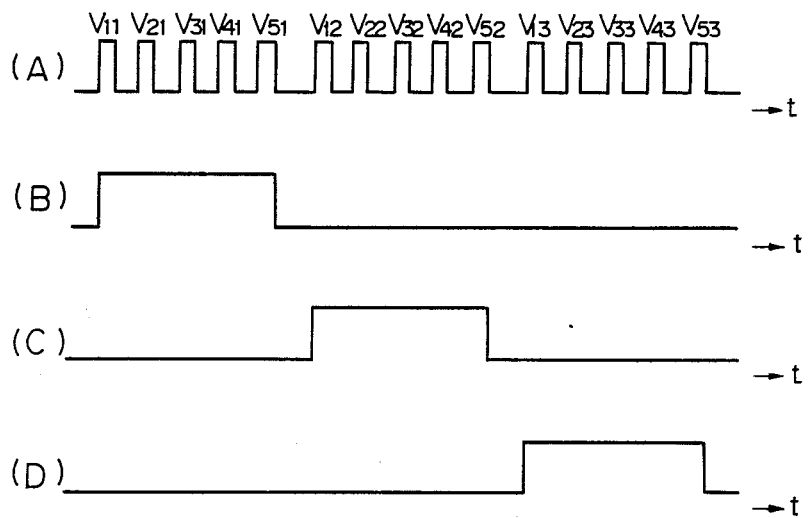

FIG. 13 shows a system of the color image generating device as shown in FIG. 12, and FIG. 13(A) shows a series of voltage pulses inputted to heat generating resistive members (56a, 56b—) of the light modulation element L.M. V1i, V2i,—V6i(i=1—3) are voltage pulses applied to the above-mentioned heat generating resistive members (56a, 56b—56e), respectively, and i(=1—3) indicates the number of the cycle. FIG. 13(B) shows an electric current signal pulse inputted to the LED 709a, and LED 709a emits light during the period that the above-mentioned voltage pulse series VII. V21–V51 are generated. FIG. 13(C) shows as electric current signal pulse inputted to LED 709b, and the LED emits light during the period that the above-mentioned voltage pulse series V12, V22–V52 are generated. FIG. 13(D) shows that LED 709c emits light while the voltage pulse series V13. V23–V53 are generated.

In FIG. 13(A), B), (C), and (D), the abscissa is a time, and the above-mentioned signal pulse is generated periodically in the previous time zone (not shown). As shown in FIG. 12, when the light receiving medium 704 moves to the direction as shown by an arrow, there are formed, on the surface of the light receiving member, red, green and blue spots aligned in the direction of the arrow, that is, in the direction of movement of the light receiving medium. By forming one picture element using the three spots, there can be effected color display.

In FIG. 13(A), voltage pulses are inputted to all heat generating resistive members at the same interval, but if voltage pulses are generated corresponding to image signals, optional color images can be formed on the light receiving medium 704. As mentioned above, according to the present invention, it is not necessary to have particularly a polarized light characteristic, and light sources having different wavelengths can be used.

Figure 14:
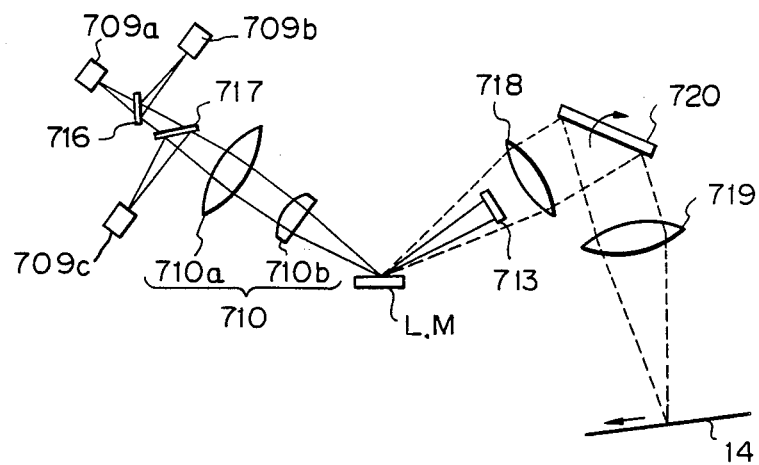
FIG. 14 and FIG. 15 show further examples of a color image forming light modulation apparatus.

FIG. 14 is an application example of an apparatus shown in FIG. 12, and a color image shown in FIG. 12 is formed by using a deflecting device 720 and scanning the whole surface of a light receiving medium 704 with a scanning spot.

If a photosensitive recording material such as silver salt film is selected as the light receiving medium, a digital color printer can be realized. Or, if a light diffusion screen is used as a light receiving medium, color display can be conducted.

According to the present invention, the light extinguishing ratio of the signal light (divergent light caused by light scattering) is high, and in addition, since the divergent efficiency is high. luminance of the image formation spot light on the light receiving medium can be made high, and the above-mentioned digital color printer or color display can be realized. Needless to say, in digital color printers and displays, the light source may be one, that is, monochromic printers or monochromic display.

In the examples shown in FIG. 9–FIG. 14, as the signal light, a divergent light produced by light scattering, but, needless to say, as the signal light, a non-divergent light may be used as well, as shown in FIG. 7(B). Therefore, it is omitted to explain FIG. 9–FIG. 14 where such non-divergent light is used.

Figure 15:
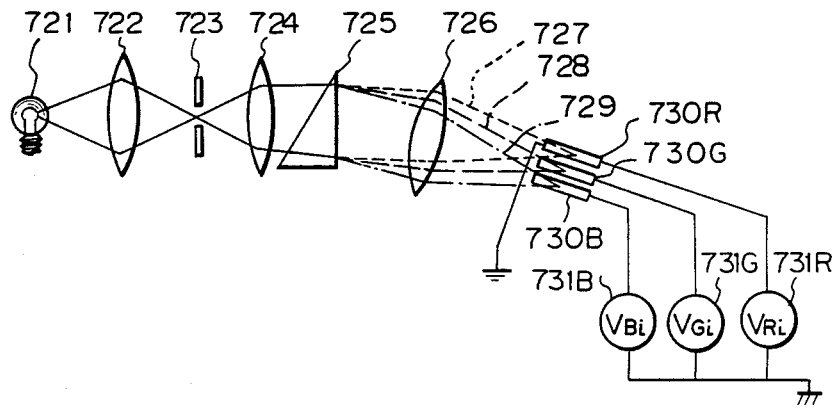

FIG. 15 shows a further example of a light modulation apparatus for producing color images according to the present invention.

In FIG. 15, a light source 721 is an oridinary white light lamp such a halogen lamp, lens 722 is a condensing lens, 723 is a pinhole plate for limiting the secondary light source image, 724 a collimator lens, 725 a prism causing the color dispersion, 726 a convergent lens, and 730R, 730G and 730B are heat generating resistive members for generating red, green and blue scattered lights as color signals, and are connected to voltage impressing means 731R, 731G and 730B generating voltage pulses independently corresponding to the input signals, respectively. Here, for simplifying the explanation, details of the light modulation element are not shown, but are the same as those in FIG. 6 except for the above-mentioned heat generating resistive member portion.

In the above-mentioned example, focussed light images of a red light flux, a green light flux and a blue light flux are formed on heat generating resistive members 730R, 730G and 730B, respectively, by a color dispersion prism 725 and a lens 726, and each color signal light can be modulated corresponding to image signal.

Further, in FIG. 15, a cylindrical lens having a generatrix perpendicular to the paper is used in place of the lens 726 so that a red light flux, a green light flux and a blue light flux form images in a form of line. The line-like fluxes corresponding to these colors are formed in parallel at a small distance. Therefore, the above-mentioned heat generating resistive members 730R, 730G and 730B are made one unit, and a plurality of the units are arranged along the direction of the line-like image to form a plurality of color picture element series. When a diffraction grating is used in place of a prism as a light flux dispersion means in FIG. 15, the same effect can be obtained.

In FIG. 16, a further example of a light modulation apparatus according to the present invention is illustrated. This shows that there is not any limitation to the direction of a light flux incident on the light modulation element according to the present invention.

Figure 16A:
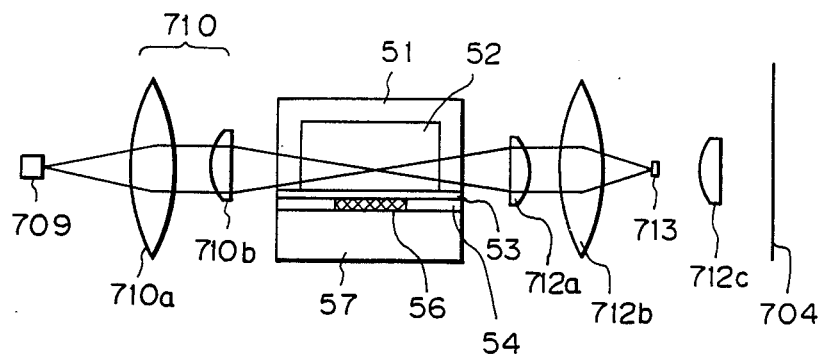
FIG. 16(A) and FIG. 16(B) show a further example of a light modulation apparatus according to the present invention.
Figure 16B:
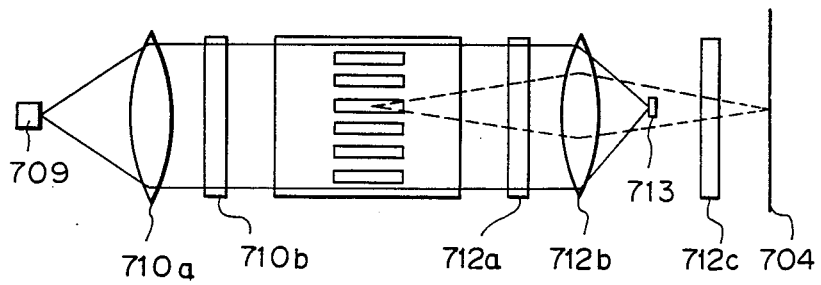

FIG. 16(A) is a figure viewed in the direction of arrangement of heat generation resistive members. FIG. 16(B) is a top view of FIG. 16(A).

The constituting members are the same as those of the light modulation apparatus in FIG. 9, but in the case of the optical system of FIG. 9, the center ray of light of a light flux emitted from a light flux generating means constituted of a light source 709 and a line image forming optical system 710 incident on the light modulation element is incident on the heat generating resistive member layer 56 at an angle while in the optical system of FIG. 16, the light flux incident on the light modulation element is incident parallel to the heat generating resistive member layer 54. In the light flux passing through the light modulation element, the non-divergent light flux is shaded while the divergent light flux reaches the surface of the light receiving medium.

Figure 17A:
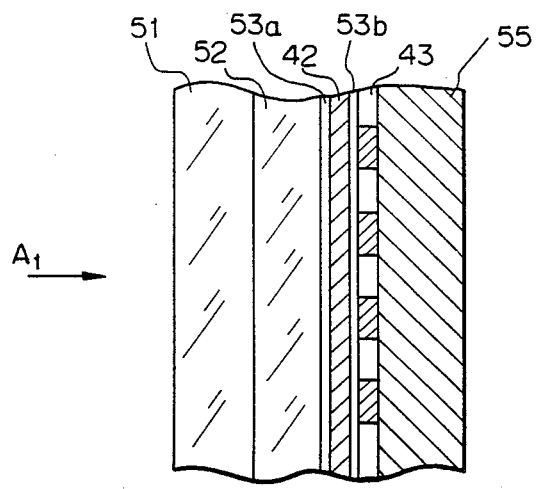
FIG. 17(A) and FIG. 17(B) show an example of a light modulation element used in the present invention.
Figure 17B:
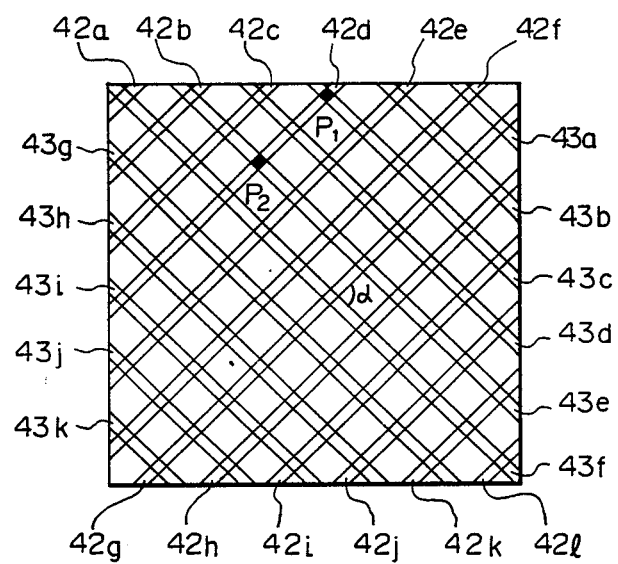

FIG. 17 shows a light modulation element capable of generating light scattering in row and column. FIG. 17(A) is a side view of a light modulation element and FIG. 17(B) is a front fiew of the light modulation element, that is, the state of arrangement of heat generating resistive layer when FIG. 17(A) is viewed in the direction of arrow A.

In FIG. 17(A), a transparent protective plate 51, an organic polymer gel thin layer 52 and a support 55 are the same as those of the light modulation element in FIG. 5, 53a and 53b are thermally conductive insulating layers. Each of 42 and 43 is heat generating resistive member layers composed of a plurality of line-like heat generating resistive members arranges parallel to each other at the same distance, and as shown in FIG. 17(B), resistive members (42a-42l) of the heat generating resistive member layer 42 and resistive member(43a-43l) of the heat generating resistive member layer 43 are arranged such that they cross each other at an angle α.

The light modulation element of FIG. 17 is designed such that when a voltage is impressed to both resistive members crossing each other, the crossing region becomes white turbid.

For example, when a voltage is impressed to 42d, 43c and 43e, the crossing regions P1 and P2 (black regions) become white turbid. Therefore, in order to obtain a pattern of two dimension formed by light scattering, for example, firstly a voltage is impressed to only 42a among 42a-42l and a voltage is impressed to a desired heat generating resistive member selected from heat generating resistive member crossing 42a. Then, a voltage is impressed to only 42b, and a voltage is impressed to a desired heat generating resistive member selected from heat generating resistive members crossing 42b. By repeating the above-mentioned procedures with respect to all of 42a-42l, a two-dimensional pattern can be obtained.

Figure 18:
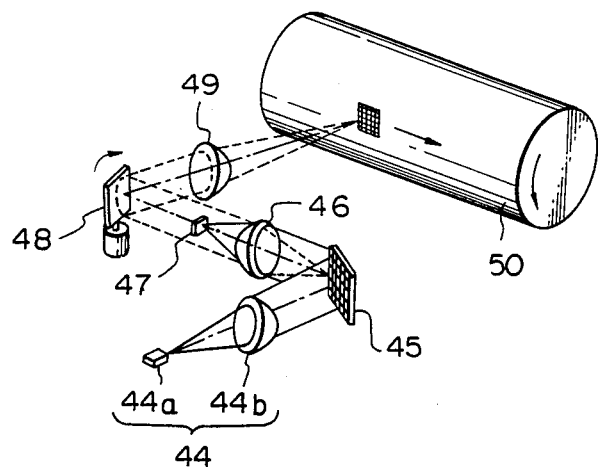
FIG. 18 shows an example of a light modulation apparatus constructed by using a light modulation element as illustrated in FIG. 17(A) and 17(B)

FIG. 18 shows an example of a light modulation apparatus according to the present invention using a light modulation element as shown in FIG. 17.

A light modulation element 45 capable of producing a two-dimensional pattern of white turbid portions is irradiated with a light flux emitted from a light flux generating means 44 constituted of a light source 44a and a collimator lens 44b. A light flux not diverged by light scattering is condensed by lens 46 and shaded by a shading filter 47 located at the focal plane of lens 46. Since the light flux scattering position of the light modulation element 45 is almost consistent with the other focal plane of lens 46, the light flux diverged by a light modulation element 45 becomes almost parallel light flux by lens 46 and an image is formed on a photosensitive medium surface 50 by a lens 49, and as a result, a two-dimensional image corresponding to the pattern generated at white turbid portions.

When a deflecting mirror 48 is placed between lens 46 and lens 49 to enable the divergent light flux to deflect, scanned images of the above-mentioned two-dimensional images can be obtained on the photosensitive member surface 50. For example, if the design is made such that a light modulation element capable of generating white turbid portions two-dimensionally produce various letter patterns by light scattering, the resulting system can be used for printer termical apparatuses such as word processor. The rotation of the above-mentioned deflection mirror is preferably intermittent rotation since the white turbid portions are not always formed simultaneously on the whole surface by the light modulation element 45.

Needless to say, the light modulation element capable of forming two-dimensional patterns can be a light modulation element of a light transmission type as shown in FIG. 10.

In the above, an example of forming white turbid portions by using heat generating resistive members is described, but the white turbid portions can be also produced by sanning a light beam and converting the scan beam to heat.

Figure 19:
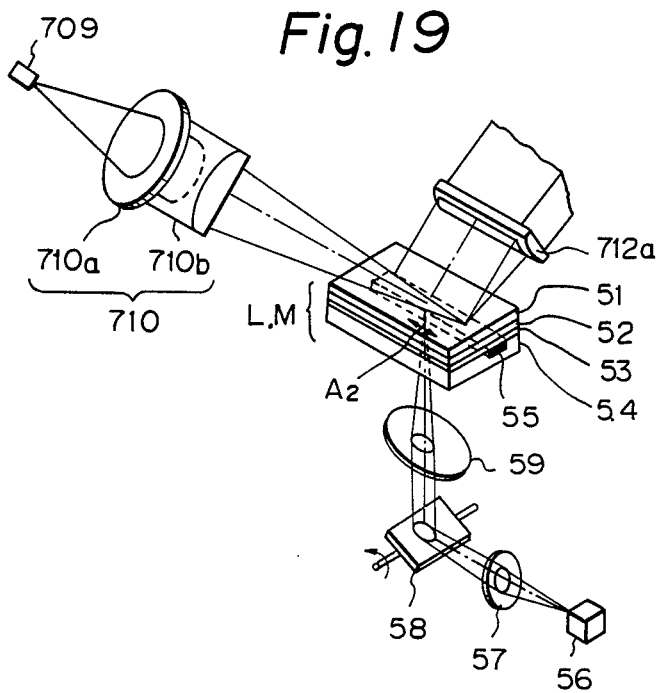
FIG. 19 shows a further example of a light modulation apparatus according to the present invention.

FIG. 19 shows an example where white turbid portions are formed by scanning a light beam, and the system is constituted of light modulation element L.M, transparent protective plate 51, organic polymer gel thin layer 52, thermally conductive insulating layer 53, and transparent support 54. Support 54 is provided a heat absorbing layer 55. 56 is a semiconductor laser capable of self modulation, and a light flux from the semiconductor laser 56 becomes a parallel beam by a collimator lens 57 and forms an image on the above-mentioned heat absorbing layer 55 by a condenser lens 59 for scanning by way of galvanomirror 58.

The heat absorbing layer 55 is constituted of a material which absorbs particularly well a light flux of a wavelength from semiconductor laser 56, and therefore, the light flux passing the heat absorbing layer 55 becomes substantially zero.

A scanning optical system is set such that when the galvanomirror 58 is rotated around the rotation axis, the light beam spot moves along the heat absorbing layer 55 in the direction of arrow $A_2$.

At the region of heat absorbing layer 55 where beam spots by the semiconductor laser 56 are formed, the light beam is converted to heat and white turbid portions are formed in the organic polymer gel thin layer by way of insulating layer 53. Therefore, a white turbid portion can be formed at a desired position by "on or off" of a beam emitted from the semiconductor laser according to the rotation of galvanomirror 58.

As an optical system capable of projecting a light flux diverged by the white turbid portion and leading the divergent light to the light receiving medium, needless to say, the optical system in FIG. 9 and all of the above-mentioned optical systems of reflection type can be used, and therefore, the explanation is omitted here.

By providing the heat absorbing layer 55 on the whole surface and making the scanning optical system projecting a light beam to the heat absorbing layer of a two-dimensional scanning optical system type, there is obtained a light modulating element of iight scattering having a two-dimensional pattern.

As mentioned above, the light modulation apparatus according to the present invention has the following advantages as compared with conventional light modulation apparatuses.

(1) By selecting an organic polymer gel having thermal effect, there can be obtained a relatively large divergent angle of a light flux diverged by light scattering at the white turbid portion, and therefore, divergent light and non-divergent light can be efficiently separated from each other, and the utilization efficiency of light flux and S/N ratio are high.

(2) Upon diverging by light scattering, constant scattering characteristics can be obtained without depending upon the incident angle of light flux incident on an organic polymer gel having white turbid portions. Therefore, the arrangement of the optical system is not subjected to any limitation.

(3) When an electrochemical crystal is used, one light modulation can be effected by using two electrodes. On the contrary, in the case of using diverging by light scattering according to the present invention, one light modulation can be made by one electrode and therefore, a modulation of high density per unit area is possible and a high quality can be attained upon display or recording.

(4) In the case of diverging a light flux by light scattering, it is not necessary to polarize the incident light flux, and even when ordinary light sources other than laser are used, the same effect can be obtained. Therefore, the apparatus can be manufactured at low cost.

(5) The heat generating resistive member for generating a white turbid portion can be easily fabricated by a process for producing I.C. patterns, and it is easily possible to arrange at a high density such as 100 lines or more per 1 mm, and as a result, images of high quality can be obtained.

In addition, by using a process for producing I.C. patterns, 1,000–10,000 pieces of heat generating resistive members can be arranged on the order of micron. It is easy to arrange heat generating resistive members which provide the number of dots sufficient for scanning one line. Thus, scanning of one line can be effected simultaneously so that the speed of image recording and image display can be enhanced.

According to a further embodiment of the present invention, the optical element is fundamentally constituted of a substrate, a transparent protective plate placed at a constant distance from the substrate, and a light modulation member provided between the substrate and the transparent protective plate. The light modulation member comprises a solvent, a polymer gel formed in the solvent and a light absorbing heat generating agent. The polymer gel exhibits a light scattering property when heated while it exhibits transparency when cooled. The objects of the present invention can be mainly attained by the above-mentioned feature.

As the substrate, any of known substrates for optical elements can be used as far as the substrate is inert to the solvent constituting the polymer gel mentioned later. For example, when the optical element is of a light transmission type, there may be used a transparent material such as glass, plastics and the like, and when the optical element is of a light reflection type, there may be optionally used a material which light can not pass through, for example, semiconductors such as silicon and the like, ceramics, metals such as aluminum and the like, and opaque plastics, or the above-mentioned transparent materials on which a metal film is deposited. The substrate is preferably about 100 μm–5 mm thick in case of light transmission mission type or reflection type regardless of the shape.

As the transparent protective plate constituting the optical element of the present invention, there may be used any of known transparent materials such as glass, plastics, dielectric member and the like, and the thickness of the transparent protective plate is preferably about 100 μm–2 mm for any type of optical elements.

The polymer gel used in and primarily characterizing the present invention comprises a crosslinked polymer which is not infinitely dissolved in water, appropriate organic solvents, water or mixtures thereof and absorbs and contains such solvent to form a polymer gel.

As the crosslinked polymer, there may be mentioned polyalkenes such as polypropylene, polyisobutene and the like, polydienes such as polybutadiene, polyisoprene and the like, polyvinyl compounds such as polyvinyl acetate, polymethacrylate, polymethacryl amide and the like, polystyrenes such as polystyrene, poly-α-methylstyrene and the like, copolymers of monomers constituting the above-mentioned or other polymers, polyethers such as polyethylene oxide and the like, polyimines such as polyethylene imine and the like, polyesters such as polyoxyethylene adipoyl and the like, polyamides such as polyglycine and the like, and other known chain polymers which have polymer chains crosslinked moderately, do not completely dissolved in a solvent and absorb and contain a solvent to form gel.

Such crosslinked structure can be easily formed by various known methods, for example, a method where upon producing the polymer, a polyfunctional monomer is partly used as a crosslinking agent to form a crosslinked structure simultaneously with polymerization; a method where a reactive monomer is also used to form crosslinking points in a polymer and a crosslinked structure is produced utilizing the crosslinking points; and a method where crosslinking is caused by using radiation or the like.

As a solvent used for forming organic polymer gel by the above-mentioned crosslinked polymers there may be mention known organic solvents, water or mixtures thereof, for example, water, alcohols such as methanol, ehtanol and the like, ketones such as acetone, methyl ethyl ketone and the like, hydrocarbons such as pentane, cyclohexane, benzene and the like, halogenated hydrocarbons such as tetrachloroethane, dichlorobenzene, and the like, esters such as ethyl formate, ethyl acetate, isoamyl acetate and the like, ethers such as dioxane, diglycide and the like, amides such as dimethyl formamide, dimethyl acetamide, and the like, sulfur-containing solvents such as dimethyl sulfoxide and the like, or mixtures thereof. In addition, there may be mentioned solutions composed of the abovementioned solvents in which a solute such as lithium perchlorate, ammonium propionate, urea, glucose and the like is dissolved.

The polymer gel used in the present invention can be formed from the above-mentioned crosslinked polymer and a solvent. An important point is the combination of the crosslinked polymer and the solvent, and the combination is to be such that the crosslinked polymer can form a gel and the resulting gel becomes white turbid and light scattering at a temperature which is not so high, preferably about 30°–100° C. by heat absorption.

The present inventors have found that, upon formation of polymer gel, if a crosslinked polymer and a solvent are appropriately combined, the crosslinked polymer is precipitated and white turbidity is formed and a light scattering property appears by change in temperature, that is, temperature rise, and further found that the polymer gel is formed into, for example, a thin layer of about 1–1,000 μm, preferably 1–100 μm and when heat is applied partly to the thin layer, white turbidity is immediately formed at the heated portion and the heated portion becomes of light scattering property while when heat is removed, the white turbid portion is immediately eliminated and becomes transparent. In addition, it has been found that the very excellent heat response, that is, transparency (light transmission)⟷white turbidity (light scattering), is useful as a light modulation member of a light modulation apparatus and when this light modulation member is used, there can be obtained a light modulation apparatus free from various drawbacks.

The polymer gel having such an excellent heat response can be easily formed by selecting a solvent suitable for the selected crosslinked polymer and controlling the solvent affinity of the crosslinked polymer.

Further, the heat response of an organic polymer gel can be controlled to a desired range by once forming a polymer gel by using a relatively good solvent and then absorbing a relatively poor solvent thereto, or by using a solvent mixture of various mixing ratio.

According to the detailed study of the present inventors, it has been found that a desired organic polymer gel can be produced by using a crosslinked polymethacryl amide type polymer, preferably, N-alkyl substituted crosslinked polymethacryl amide, and water.

As the desired crosslinked polymethacrylamide derivative polymer, there may be mentioned crosslinked homopolymers of monomers such as N-ethyl methacrylamide, N-n-propyl methacrylamide, N-iso-propyl methacrylamide, N-cyclopropyl methacrylamide, N,N-ethyl methyl methacrylamide, N,N-diethyl methacrylamide, N-acrylpyrrolidone, N-acrylpiperidine and the like, or crosslinked copolymers of the above-mentioned monomer with other monomer.

The crosslinking can be easily effected by using a necessary amount of a polyfunctional monomer such as N,N-methylene-bis-acrylamide, ethyleneglycol dimethacrylate and the like upon polymerization of methacrylamide.

The polymer gels composed of crosslinked polymethacrylamide derivative and water are the best organic polymer gel since the reversible change between transparency and white turbidity by heat occurs at about 0°–80° C. and the heat response is very sharp.

The light modulation member used in the present invention, that is, a polymer gel thin layer may be produced by forming a polymer gel having a concentration of crosslinked polymer of about 0.1–20% by weight and placing the polymer gel between a transparent protective plate and a substrate As the light absorbing heat generating agent seconarily characterizing the optical element of the present invention, there may be used any material capable of selectively absorbing a light of a certain wavelength to generate heat and being dissolved in the above-mentioned solvent. Such materials are easily commercially available as various organic colorants, inorganic colorants, organic salts, inorganic salts, UV absorbers, IR absorbers, and the like. In the present invention, there may be used the material selected appropriately. Preferable example is IR absorbers, for example, where the solvent is an aqueous solvent, metal salts such as copper sulfate, nickel sulfate and the like are preferred, and where the solvent is an organic material, organic IR absorbers such as IRG-003 (tradename, supplied by Nihon Kayaku K.K.) and the like are preferred. In addition, as other examples of IR absorbers, there may be mentioned cyanines, xanthene derivatives, thiapyrylium salt derivatives and the like.

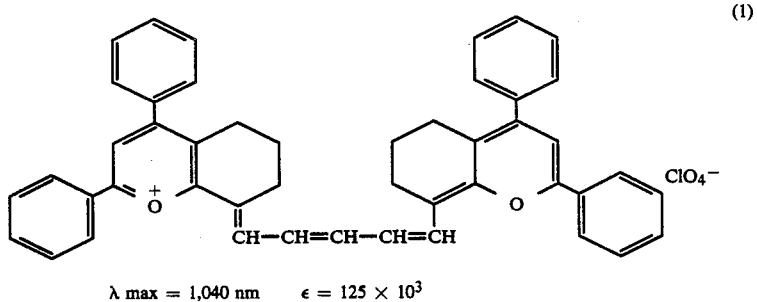

$\lambda$ max = 1,040 nm    $\epsilon$ = 125 × 10³

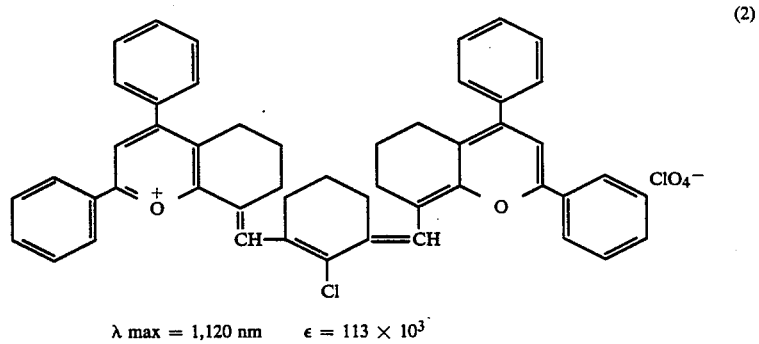

$\lambda$ max = 1,120 nm    $\epsilon$ = 113 × 10³

-continued (3)

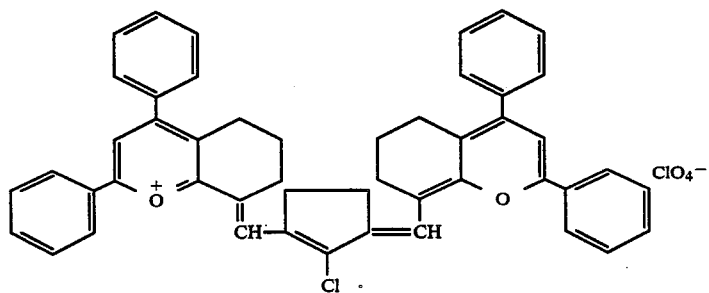

λ max = 1,145 nm  ε = 143 × 10³

(4)

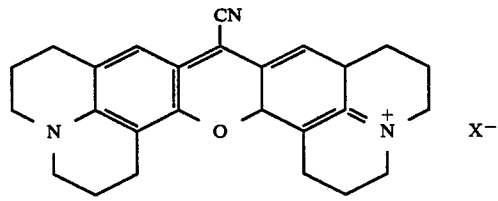

λ abs = 678 nm  λ las = 730 nm (5)

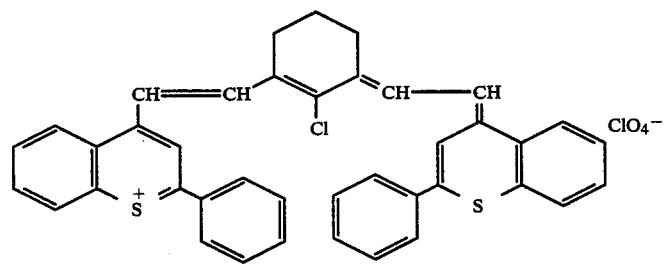

The light absorbing heat generating agent is to be selected such that the agent can be preferably combined with a polymer gel and a solvent contained therein. In general, the light absorbing heat generating agent is dissolved at a concentration of about $10^{-5}-10^{-2}$M and used though it varies depending on the relation with the solvent and the polymer gel to be combined therewith. The light absorbing heat generating agent is preferably added upon forming the polymer gel.

The optical element of the present invention is fundamentally constituted of the above-mentioned materials, and in addition, in order to improve the contrast of the resulting optical image, there may be combined with conventional known techniques such as providing a visible light reflecting member, a visible light absorbing layer or the like. The method of fabricating the optical element such as laminating a transparent protective plate, a polymer gel layer and a substrate, may be that of known techniques.

The present invention will be further explained referring to the drawing illustrating preferred embodiments of the optical element according to the present invention.

Figure 20:
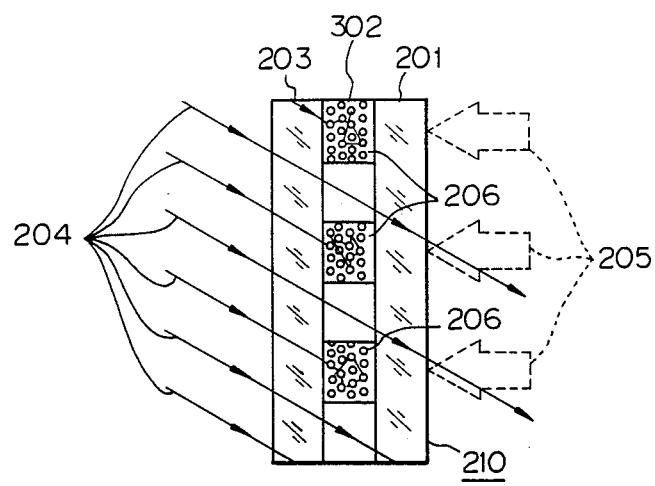
FIG. 20 shows diagrammatically an optical element of light transparent type according to the present invention.
Figure 21:
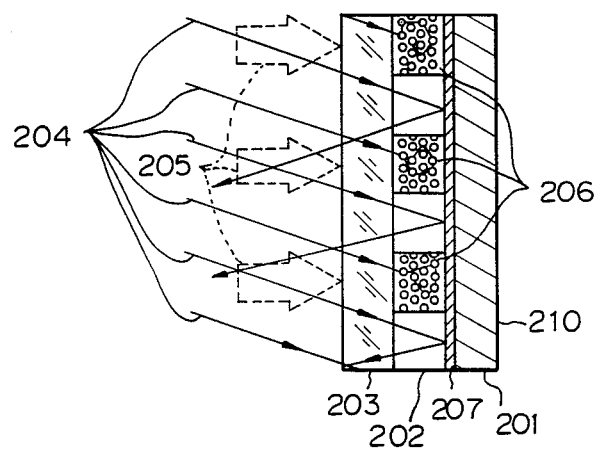
FIG. 21 shows diagrammatically an optical element of reflection type according to the present invention.

FIG. 20 shows diagrammatically an optical element of a light transmission type according to the present invention and FIG. 21 an optical element of a reflection type according to the present invention.

In FIG. 20, an optical element 210 of a light transmission type is constituted of the above-mentioned transparent plate 201, polymer gel layer 202 and transparent protective plate 203. In case that a light beam 204 having a wavelength not absorbed by the light absorbing heat generating agent present in polymer gel layer 202 (non-absorbed light) is projected to optical element 210, the non-absorbed light 204 passes through optical element 210 almost as it is and goes out of substrate 201.

On the contrary, when a light beam 205 which is absorbed by the light absorbing heat generating agent (absorbed light) is projected to the optical element, the light absorbed to the light absorbing heat generating agent uniformly present in the polymer gel layer generates heat by which the polymer gel is heated resulting in, for example, that the heated portion becomes white turbid to form a light scattering portion 206 and scatter the non-absorbed 204. Therefore, when the non-absorbed light 204 is projected to the whole surface and an absorbed light 205 is projected as an information light in a form of an optional pattern from the same direction or from the opposite side of the optical element 210, there is formed an image 206 following the information souce.

In FIG. 20, an image display is diagrammatically shown in which as a light absorbing heat generating agent, there is used an infrared ray absorber and as a non-absorbed light 204, there is used a white light beam and as an absorbed light 205, there is used an infrared ray.

FIG. 21 shows diagrammatically an embodiment of a reflection type where a light reflection layer 207 is provided on the surface of a substrate, and the principle of performance is the same as that in FIG. 20 except that non-absorbed light 204 is reflected.

In the above, as a light absorbing heat generating agent, an infrared ray absorber is used, but in the case where, in place of the infrared ray absorber, there are used various colorant capable of absorbing a light beam of a specified wavelength and generating heat or a UV absorber absorbing ultraviolet ray and generating heat, and a light which is not absorbed by the light absorbing heat generating agent is used simultaneously, it will be clear that various optical displays can be effected by the same principle of performance as that in the above-mentioned embodiment.

A further example of the present invention is shown below.

EXAMPLE 7

As each of a substrate 201 and a transparent protective plate 203, there is used a sufficiently cleaned glass plate of 0.3 mm thick, 50 mm × 10 mm in size, and the substrate 201 and the transparent protective plate 203 are disposed facing to each other with a Mylar film as a spacer at a distance of 10 μm and adhered to each other.

Isopropyl acrylamide 5 g, N,N-methylene-bis-acrylamide 80 mg, and ammonium persulfate 30 mg were dissolved in a cold water 100 ml, and there are added to the resulting mixture tetramethyl ethylenediamine 60 μl and copper sulfate becoming a concentration of $7 \times 10^{-4}$ M.

The resulting solution is deaerated by an aspirator, and immediately charged into a space between substrate 201 and transparent protective plate 203 and sealed, and then allowed to stand at room temperature for 30 min. to effect polymerization resulting in formation of a polymer gel layer 202. As a result, there is produced an optical element 210 of a light transmission type of the present invention as illustrated in FIG. 20.

The above-mentioned optical element 210 was irradiated by scanning with a semiconductor laser beam 205 of input of 20 mW and wavelength of 830 nm from the back surface of optical element 210 in accordance with an information signal with focussing to a polymer gel layer 202, and it was observed that the irradiated region 206 in polymer gel layer 202 was immediately changed from transparency to light scattering property.

It appears that the semiconductor laser beam 205 is absorbed at the irradiated region of polymer gel layer 202 and changed to heat and the polymer gel is heated by the heat. The heating time by the semiconductor laser beam 205 was only an instant, and when the irradiation was interrupted, the polymer gel layer 202 immediately returned to the original light transmission state. Thus, the thermal responsing property was very good.

When the irradiation experiment by the abovementioned laser beam 205 was repeated, it was found that the reproducibility and signal responsing property is practically sufficient.

EXAMPLE 8

Repeating the procedure of Example 7 except that isopropyl methacrylamide was used in place of isopropyl acrylamide and nickel sulfate was used in place of copper sulfate, there was formed an optical element of the present invention having excellent performance similar to that in Example 7.

EXAMPLE 9

A substrate 201 constituted of an aluminum vapor-deposited layer of 1,000 Å thick and a polyethylene protective layer produced by plasma polymerization of 1,000 Å thick overlying the aluminum vapor-deposited layer was used, and as a transparent protective plate 3, a sufficiently cleaned glass plate of 0.3 mm thick and 50 mm × 10 mm in size was used.

The substrate 201 and the transparent protective plate 203 were adhered to each other face to face at a distance of 10 μm using a Mylar film as a spacer.

Then, N-ethyl acrylamide 0.5 g, ethyleneglycol dimethacrylate 60 mg, and ammonium persulfate 10 mg were dissolved in 30 ml of a cold water, and there were added to and dissolved in the resulting mixture 30 μl of tetramethyl ethylenediamine and nickel sulfate becoming a concentration of $10^{-3}$M. The solution thus obtained was deaerated with nitrogen bubble. The other procedures were the same as those in Example 7 to produce an optical element of a reflection type according to the present invention as illustrated in FIG. 21.

With respect to the resulting optical element, reflection light was measured by the same method as in Example 7. The result was as good as that in Example 7.

EXAMPLES 10-15

Repeating the procedure of Example 9 except that each of IRG-003 and IR absorbers of the above-mentioned formulas (1)-(5) was used in place of nickel sulfate in the same concentration, each of the optical elements of the present invention was produced. These optical elements exhibited excellent performance similar to that in Example 9.

As shown in each of the above examples, the optical element according to the present invention exhibits good performance in both transmission type and reflection type.

As described above, the optical element according to the present invention is excellent in light scattering characteristics corresponding to an information signal, and therefore, there can be formed clear images of high contrast and high resolution, and limitation to the visual field angle can be eliminated. Thus, in the case of using the optical element of the present invention as a display apparatus, the user does not suffer an eye fatigue even when the display apparatus is operated for a long time. In addition, since the polymer gel layer is easily modulated by a small amount of heat, there is a large economical advantage that the power consumption of the display apparatus is a very little.

What is claimed is:

1. An optical element comprising a substrate, a light modulation member and a transparent protective plate, characterized in that the light modulation member is composed of a solvent, an organic crosslinked polymer gel formed in the solvent and a light absorbing heat generating agent dissolved in the solvent, and the polymer gel exhibits a light scattering property when heated and exhibits transparency when cooled.

2. An optical element according to claim 1 in which the polymer gel is an aqueous gel of acrylamide amide or methacrylamide type crosslinking polymers.

3. An optical element according to claim 1 in which the light absorbing heat generating agent is an infrared absorbing agent.

4. A light modulation apparatus comprising a signal input portion, a light receiving medium and a light modulation element between said signal input portion and said light receiving medium where said light modulation element comprises an organic crosslinked polymer gel containing a light-absorbing heat-generating agent, said organic crosslinked polymer gel capable of taking two different states a transparent state and an opaque state, on heating.

5. A light modulation apparatus comprising a signal input portion, a light receiving medium and a light modulation element and a light projecting means between said single input portion and said light receiving medium, said optical modulation element having a light modulation layer comprising an organic crosslinked polymer gel containing a light-absorbing heat-generating agent, said organic crosslinked polymer gel capable of taking a transparent state and an opaque state on heating such that incident light reflects irregularly at a portion in the opaque state of said light modulation layer to give outgoing light (1) having a deformed wave surface and incident light transmits through a portion in the transparent state of said light modulation layer to give outgoing light (2) having a non-deformed wave surface, whereby either one of said outgoing light (1) and (2) is employed as information light to be projected onto said light receiving medium by said light projection means.

6. A light modulation apparatus according to claim 5, comprising an optical system for forming an image of said outgoing light (2) having a non-deformed wave surface.

7. A light modulation apparatus according to claim 6, comprising a filter placed at the position of the image formed from the outgoing light 2 for intercepting said outgoing light (2) and for projecting said outgoing light (1) as information light onto a light receiving medium.

8. A light modulation apparatus according to claim 6, comprising a filter having an opening at the position of the image formed from the outgoing light (2) for intercepting said outgoing light (1) and for projecting said outgoing light (2) as information light onto a light receiving medium.

9. A light modulation apparatus according to claim 5, comprising an optical system for forming an image of a line placed at said signal input portion.

10. A light modulation apparatus according to claim 5, comprising a light source including a red light emitting diode, a green light emitting diode, and a blue light emitting diode at said signal input portion.

11. A light modulating apparatus according to claim 5, comprising a light source including a red light emitting diode, a green light emitting diode, and a blue light emitting diode at said signal imput portion.

* * * * *

UNITED STATES PATENT AND TRADEMARK OFFICE
CERTIFICATE OF CORRECTION

PATENT NO. : 4,952,035

DATED : August 28, 1990

INVENTOR(S) : SATOSHI YUASA, ET AL.

It is certified that error appears in the above-identified patent and that said Letters Patent is hereby corrected as shown below:

COLUMN 2

Line 2, "not" should be deleted.
    Line 7, "suffur" should read --suffer--.
    Line 10, "abovemen-" should read --above-men- --.
    Line 25, "DRAWING" should read --DRAWINGS--.

COLUMN 3

Line 3, "TEH" should read --THE---.
    Line 11, "transpartent" should read --transparent--.

COLUMN 4

Line 1, "exhabit-" should read --exhibit- --.
    Line 35, "irradated" should read --irradiated--.
    Line 64, "hydrochoric" should read --hydrochloric--.

COLUMN 5

Line 61, "$Al_2O_3NaF$," should read --$Al_2O_3$, NaF,--.

COLUMN 6

Line 19, "spars" should read --sparse--.
    Line 24, "explanation the" should read --explanation, the--.
    Line 41, "adhered Then" should read --adhered. Then--.
    Line 45, "ethylede" should read --ethylene--.
    Line 65, "immeiately" should read --immediately--.

UNITED STATES PATENT AND TRADEMARK OFFICE
CERTIFICATE OF CORRECTION

PATENT NO. : 4,952,035

DATED : August 28, 1990

INVENTOR(S) : SATOSHI YUASA, ET AL.

It is certified that error appears in the above-identified patent and that said Letters Patent is hereby corrected as shown below:

COLUMN 7

Line 8, "50 mb" should read --50 mg--.
Line 38, "layer 27 Therefore" should read --layer 27. Therefore--.

COLUMN 8

Line 18, "150 µm" should read --150 µl--.
Line 26, "°V" should read --20 V--.
Line 48, "further," should read --further--.

COLUMN 9

Line 14, "poly-αmeth-" should read --poly-α-meth- --.
Line 22, "dissolved" should read --dissolve--.
Line 29, "tion.," should read --tion;--.
Line 33, "of" should read --or--.
Line 34, "bY" should read --by--.

COLUMN 10

Line 45, "is an" should read --is, an-- and "layer may" should read --layer, may--.
Line 49, "1 µm 1 mm" should read --1 µm - 1 mm--.

UNITED STATES PATENT AND TRADEMARK OFFICE
CERTIFICATE OF CORRECTION

PATENT NO. : 4,952,035
DATED : August 28, 1990
INVENTOR(S) : SATOSHI YUASA, ET AL.

It is certified that error appears in the above-identified patent and that said Letters Patent is hereby corrected as shown below:

COLUMN 11

Line 2, "arranged 55" should read --arranged, 55--.
    Line 54, "(56a, 56b, ---." should read
        --(56a, 56b, ---).--.
    Line 68, "member 5c" should read --member 56c--.

COLUMN 12

Line 21, "turbid" should read --turbid portion--.
    Line 65, "FIG. 8 A" should read --FIG. 8(A)--.
    Line 67, "FIG. 8 B" should read --FIG. 8(B)--.

COLUMN 13

Line 8, "support 5," should read --support 55,--.
    Line 35, "a" (first occurrence) should read --an--.
    Line 43, "an" should read --a--.
    Line 61, "consists" should read --consistent--.
    Line 68, "flux 713" should read --flux 707--.

COLUMN 14

Line 9, "sphericallens 712b" should read --spherical lens 712b--.
    Line 12, "filter 705" should read --filter 713--.
    Line 23, "exprission" should read --expression--.
    Line 46, "53'are" should read --53' are--.

UNITED STATES PATENT AND TRADEMARK OFFICE
CERTIFICATE OF CORRECTION

PATENT NO. : 4,952,035
DATED : August 28, 1990
INVENTOR(S) : SATOSHI YUASA, ET AL.

It is certified that error appears in the above-identified patent and that said Letters Patent is hereby corrected as shown below:

COLUMN 15

Line 11, "as" (second occurrence) should read --an--.
    Line 39, "series VII." sould read --series V11,--.
    Line 40, "as" should read --an--.
    Line 45, "series V13." should read --series V13,--.
    Line 47, "FIG. 13(A), B)" should read --FIG. 13(A), (B)--.

COLUMN 16

Line 11, "high." should read --high,--.
    Line 35, "730B" should read --731B--.

COLUMN 17

Line 11, "layer 54." should read --layer 56.--.
    Line 25, "FIG. 5, 53a" should read --FIG. 5. 53a--.
    Line 28, "arranges" should read --arranged--.
    Line 60, "44aand" should read --44a and--.

COLUMN 18

Line 11, "termical" should read --terminal--.
    Line 24, "sanning" should read --scanning--.
    Line 32, "is provided" should read --is provided with--.

UNITED STATES PATENT AND TRADEMARK OFFICE
CERTIFICATE OF CORRECTION

PATENT NO. : 4,952,035
DATED : August 28, 1990
INVENTOR(S) : SATOSHI YUASA, ET AL.

It is certified that error appears in the above-identified patent and that said Letters Patent is hereby corrected as shown below:

COLUMN 20

Line 28, "dissolved" should read --dissolve--.
    Line 42, "mention" should read --mentioned--.
    Line 54, "abovementioned" should read --above-mentioned--.

COLUMN 22

Line 20, "seconarily" should read --secondarily--.

COLUMN 24

Line 51, "non-absorbed 204." should read --non-absorbed light 204.--.

COLUMN 25

Line 4, "colorant" should read --colorants--.
    Line 52, "abovemen-" should read --above-men- --.

COLUMN 26

Line 2, "plate 3," should read --plate 203,--.
    Line 31, "clement" should read --element--.
    Line 57, "amide" should be deleted.

COLUMN 27

Line 1, "states a" should read --states, a--.
    Line 6, "single input portion" should read --signal input portion--.

UNITED STATES PATENT AND TRADEMARK OFFICE
CERTIFICATE OF CORRECTION

PATENT NO. : 4,952,035
DATED : August 28, 1990
INVENTOR(S) : SATOSHI YUASA, ET AL.

It is certified that error appears in the above-identified patent and that said Letters Patent is hereby corrected as shown below:

COLUMN 28

Line 5, "light 2" should read --light (2)--.
Line 17, Claim 10 should read --10. A light modulation apparatus according to claim 9, said optical system for forming an image of a line comprising a spherical lens and an anamorphic lens.--.

Signed and Sealed this

Twenty-fourth Day of November, 1992

Attest:

DOUGLAS B. COMER

*Attesting Officer*  *Acting Commissioner of Patents and Trademarks*